US007626728B2

(12) United States Patent
Itagaki et al.

(10) Patent No.: US 7,626,728 B2

(45) Date of Patent: Dec. 1, 2009

(54) METHOD AND APPARATUS FOR CALCUATING COLOR DIFFERENCES ON MEASURED EVALUATION CHARTS TO EVALUATE COLOR REPRODUCIBILITY CONSIDERING IMAGE HOMOGENEITY

(75) Inventors: Tomohisa Itagaki, Abiko (JP); Nobuatsu Sasanuma, Abiko (JP); Masami Tomita, Matsudo (JP); Toshio Saishoji, Fuchu (JP); Satoshi Takayama, Chofu (JP); Miyoko Hayashi, Fuchu (JP)

(73) Assignee: Canon Kabushiki Kaisha (JP)

( * ) Notice: Subject to any disclaimer, the term of this patent is extended or adjusted under 35 U.S.C. 154(b) by 572 days.

(21) Appl. No.: 11/614,353

(22) Filed: Dec. 21, 2006

(65) Prior Publication Data

US 2007/0153340 A1 Jul. 5, 2007

(30) Foreign Application Priority Data

Dec. 28, 2005 (JP) ............................ 2005-380167

(51) Int. Cl.
*H04N 1/60* (2006.01)
*H04N 1/50* (2006.01)
*G01N 21/25* (2006.01)
*G01J 3/52* (2006.01)

(52) U.S. Cl. ....................... 358/1.9; 358/3.24; 358/504; 358/518; 356/406; 356/421

(58) Field of Classification Search .................. 358/1.9, 358/3.24, 501, 504, 518, 521, 527, 530; 382/112, 382/162, 167; 356/402, 406, 421
See application file for complete search history.

(56) References Cited

U.S. PATENT DOCUMENTS 4,685,139 A * 8/1987 Masuda et al. .............. 382/112

(Continued)

FOREIGN PATENT DOCUMENTS

JP 62-296669 A 12/1987

(Continued)

OTHER PUBLICATIONS

Related co-pending U.S. Appl. No. 11/614,296; Nobuatsu Sasanuma et al.; "Image Quality Evaluation Method and Apparatus Thereof"; filed Dec. 21, 2006; Spec. pp. 1-24; Fig. 1-8.

*Primary Examiner*—Scott A Rogers
(74) *Attorney, Agent, or Firm*—Rossi, Kimms & McDowell LLP

(57) ABSTRACT

Color reproducibility needs to be evaluated in consideration of the influence of homogeneity in page image. Hence, a first chart is formed from an image of a uniform density of a region to be evaluated, and data associated with the spectral reflectances of plural points on the first chart are input. Based on the data obtained from the first chart, color differences between a predetermined point and other points on the first chart are calculated. When the calculated color differences fall within a permissible range of heterogeneity of colors in the region, a second chart is formed from an image corresponding to a color target, and data associated with the spectral reflectances of plural points on the second chart are input. Color differences are calculated from the data obtained from the second chart and data associated with the spectral reflectance of the color target.

11 Claims, 22 Drawing Sheets

U.S. PATENT DOCUMENTS

| | | | | |
|---|---|---|---|---|
| 5,182,721 | A * | 1/1993 | Kipphan et al. | 382/112 |
| 5,818,960 | A * | 10/1998 | Gregory et al. | 358/1.9 |
| 6,631,210 | B1 * | 10/2003 | Mutoh et al. | 358/1.9 |
| 7,027,157 | B2 * | 4/2006 | Steinfield et al. | 358/518 |
| 7,027,187 | B1 * | 4/2006 | Zuber | 358/1.9 |
| 7,130,076 | B2 * | 10/2006 | Shibuya et al. | 358/1.9 |
| 2007/0153309 | A1 * | 7/2007 | Sasanuma et al. | 358/1.9 |
| 2007/0229870 | A1 * | 10/2007 | Doi et al. | 358/1.9 |
| 2009/0086273 | A1 * | 4/2009 | Ming et al. | 358/1.9 |

FOREIGN PATENT DOCUMENTS

| | | | |
|---|---|---|---|
| JP | 63-185279 | A | 7/1988 |
| JP | 1-309082 | A | 12/1989 |
| JP | 8-219886 | A | 8/1996 |
| JP | 2001-144987 | A | 5/2001 |
| JP | 2002-344759 | A | 11/2002 |
| JP | 2003-216398 | A | 7/2003 |

* cited by examiner

FIG. 11

| | |
|---|---|
| DETERMINATION RESULT OF HOMOGENEITY IN PAGE | PASS |
| HOMOGENEITY IN PAGE IMAGE MAX_ΔE | 3.22 |
| HOMOGENEITY IN PAGE IMAGE MIN_ΔE | 0 |
| HOMOGENEITY IN PAGE IMAGE AVE_ΔE | 1.14 |
| DETERMINATION RESULT OF COLOR MATCHING | PASS |
| COLOR MATCHING MAX_ΔE | 17.61 |
| COLOR MATCHING MIN_ΔE | 0.11 |
| COLOR MATCHING AVE_ΔE | 2.58 |
| DATE | 2005/5/30 |
| TESTER | T.I |
| REFERENCE_MODEL | JapanColor type1 |
| DESTINATION_MODEL | 1180 |
| INSTRUMENT | GMSS |
| ILLUMINANT | D50 |
| VISUAL_FIELD | 2° VISUAL FIELD |
| FILTER_STATUS | No |

| TONE VALUES (%) | TARGET | LOWER LIMIT | UPPER LIMIT |
|---|---|---|---|
| 0 | 0.05 | 0.04 | 0.06 |
| 3 | 0.07 | 0.06 | 0.08 |
| 7 | 0.10 | 0.08 | 0.12 |
| 10 | 0.13 | 0.11 | 0.14 |
| 15 | 0.18 | 0.16 | 0.20 |
| 20 | 0.23 | 0.20 | 0.25 |
| 25 | 0.29 | 0.26 | 0.32 |
| 30 | 0.36 | 0.32 | 0.39 |
| 40 | 0.50 | 0.46 | 0.54 |
| 50 | 0.65 | 0.59 | 0.70 |
| 60 | 0.82 | 0.75 | 0.88 |
| 70 | 1.00 | 0.92 | 1.08 |
| 80 | 1.20 | 1.11 | 1.29 |
| 90 | 1.40 | 1.29 | 1.50 |
| 100 | 1.60 | 1.48 | 1.71 |

FIG. 18

| EVALUATION ITEM | ACTION UPON FAILURE |
|---|---|
| MAXIMUM DENSITY | AUTOMATIC TONE CORRECTION OF IMAGE FORMING APPARATUS |
| TONE REPRODUCIBILITY | AUTOMATIC TONE CORRECTION OF IMAGE FORMING APPARATUS |
| HOMOGENEITY IN PAGE IMAGE | ADJUSTMENT BY SERVICE PERSON, OR SHADING CORRECTION |
| MULTINARY COLOR CHARACTERISTICS | RE-PREPARATION OF ICC PROFILE |
| COLOR MATCHING PRECISION | CHANGE OF PARAMETERS THAT CHANGE GAMUT, AND RE-PREPARATION OF ICC PROFILE |

METHOD AND APPARATUS FOR CALCUATING COLOR DIFFERENCES ON MEASURED EVALUATION CHARTS TO EVALUATE COLOR REPRODUCIBILITY CONSIDERING IMAGE HOMOGENEITY

BACKGROUND OF THE INVENTION

1. Field of the Invention

The present invention relates to color evaluation processing of printed matter of an image forming apparatus.

2. Description of the Related Art

In recent years, a demand for direct imaging printers which do not require preparation of any printing plates is growing. Many businesses adopt direct imaging printers so as to shorten the preparation time of printed matter, to improve services to individual customers, and to solve environmental problems, i.e., mass-circulation production and waste. Of direct imaging printers, ink-jet printers which have relatively low prices and are suited to photo printing, and electrophotographic printers which have high productivity and can provide printing results similar to offset printing are in great demand.

In such situations, color reproducibility is extremely important in alternatives to the conventional offset printing and photo printing. Stabilization control is often executed in a printer to assure the color reproducibility. More specifically, a density sensor measures a patch pattern formed on a photosensitive body to detect a toner density. The detected toner density is fed back to a toner density controller in a developer to control the toner density (see Japanese Patent Laid-Open No. 1-309082).

Japanese Patent Laid-Open Nos. 62-296669, 63-185279, and the like propose image control by reading an image using a reader built in a copying machine. Also, Japanese Patent Laid-Open No. 2002-344759 discloses a technique which corresponds to color detection and adjusts gray balance to which the human visual perception is sensitive.

Even ink-jet printers suffer variations in color reproducibility caused by changes in the amount of ink ejection over time, individual differences in ink cartridges, and the like. For this reason, in order to accurately grasp the color reproducibility after color development of inks and to control the amount of ink ejection, products in which a density sensor is attached beside the printhead to measure the image density are commercially available.

Also, color reproducibility is important for illuminant devices such as monitors and the like. A scheme called monitor remote proof that does not use any printed matter is adopted. This scheme has a mechanism for making a client confirm color reproducibility of reference printed matter on a monitor and prompting the client to determine "pass" or "fail" of the color reproducibility. That is, the client can instantaneously execute a process so-called proof of printing on the monitor. Since digital proof data is displayed on the monitor, a shorter delivery period can be realized than paper-based proof.

The color reproduction scheme of a device which makes color reproduction on a print medium or on an illuminant, obtaining constant colors all the time and approximating color reproduction of printed matter are high-priority issues, and the printer manufacturers must guarantee them. In order to guarantee such issues, a standardized color reproducibility evaluation method is indispensable.

However, the conventional evaluation method merely represents good or poor color reproducibility or the degree of color or density heterogeneity it one page (to be referred to as heterogeneity in page image hereinafter; in other words, a color difference in page image). Owing to the characteristics of a printer, it is difficult to attain zero color difference in page image. In the case-of ink-jet printers, unevenness in scanning of a printhead, unevenness in conveying of print sheets, unevenness of the ink ejection characteristics of the printhead, and the like may occur. In the case of electrophotographic printers, it is difficult to make colors and densities in page image constant due to unevenness in scanning of a laser beam, deterioration of respective parts such as the developer, drum, transfer rollers, and the like, unevenness in melting of toner due to the biased temperature of a fixing roller, and the like. Respective manufacturers have made various efforts to avoid heterogeneity in page image, but they have not realized printers with zero color difference in page image. Note that various kinds of unevenness in printing will sometimes be referred to as "unevenness in printing".

That is, conventionally, a color difference including heterogeneity in page image has been discussed as color reproducibility. However, how much heterogeneity in page image color reproducibility exists, including whether or not the condition of heterogeneity in page image of a printer falls within an permissible range, what is to be fixed to improve color matching precision, and so forth, are unknown. For this reason, the color reproducibility is evaluated with disregard to the heterogeneity in page of the printer, and a multi-dimensional lookup table (LUT) such as an ICC (International Color Consortium) profile or the like is prepared again. Preparing an ICC profile requires processes such as print output, colorimetry, arithmetic operations of an LUT, installation of a profile in a printer controller, and the like, resulting in long processes. Since printing halts during that time interval, re-preparation of an ICC profile should be avoided as much as possible. In other words, the color reproducibility must be evaluated with consideration of the influence of the heterogeneity in page image.

Of course, a device such as a monitor or the like suffers the influence of heterogeneity of illuminant. The following description may often use "homogeneity in page image" as an antonym to "heterogeneity in page image."

Upon preparation of an ICC profile, whether or not a printer is in a normal state must be detected. If the ICC profile is prepared in a state far removed from the normal state, improvement of the color reproducibility cannot be expected. That is, the color reproducibility changes after every image control disclosed by Japanese Patent Laid-Open No. 62-296669.

Japanese Patent Laid-Open No. 2001-144987 discloses a configuration that evaluates the image quality of a printer to be evaluated based on color information of a reference evaluation pattern. According to Japanese Patent Laid-Open No. 2001-144987, if toner or the like flies in all directions, a density difference or color difference causes a mismatch to occur. Hence, that mismatch is corrected to solve the problem of color matching with subjective evaluation, thus evaluating the image quality.

Japanese Patent Laid-Open No. 2003-216398 discloses a technique which converts reference color information into a barcode, appends the barcode to print data, and prints the barcode upon printing a color evaluation pattern. That is, this reference discloses a configuration that prevents setting errors of a target and the like. In this disclosure, the barcode information is compared with measurement information of the pattern to determine whether or not colors that the creator of print data intended are reproduced.

Japanese Patent Laid-Open No. 8-219886 proposes a heterogeneity in page image evaluation scheme associated with color reproducibility. More specifically, heterogeneity of white and heterogeneity in page image due to unevenness in printing are measured using a small color difference spectrometer and XY stage.

SUMMARY OF THE INVENTION

In the first aspect of the invention, a method of evaluating an image forming apparatus is provided. The method comprises the steps of: inputting data associated with spectral reflectances of a plurality of points on a first evaluation chart output from the image forming apparatus by supplying first image data that represents an image having a uniform density in a region to be evaluated in one page to the image forming apparatus to form the first evaluation chart; calculating color differences between a color at a predetermined point and colors at other points on the first evaluation chart based on the data associated with the spectral reflectances on the first evaluation chart; inputting data associated with spectral reflectances of a plurality of points on a second evaluation chart output from the image forming apparatus by supplying second image data that corresponds to a color target for color matching to the image forming apparatus to form the second evaluation chart; calculating color differences between data associated with the spectral reflectances of the plurality of points on the second evaluation chart and data associated with spectral reflectances of the color target, which correspond to the plurality of points on the second evaluation chart; and controlling execution of the second inputting step and the second calculating step so that when the color differences calculated in the first calculating step fall within a permissible range of heterogeneity of colors in the region to be evaluated, the second inputting step and the second calculating step are executed, and when the color differences calculated in the first calculating step fall outside the permissible range, execution of the second inputting step and the second calculating step is skipped.

According to the aspect of the invention, the color reproducibility can be evaluated with consideration of the influence of the homogeneity in page image. Also, the user can recognize deteriorating factors of the color reproducibility.

Further features of the present invention will become apparent from the following description of exemplary embodiments with reference to the attached drawings.

BRIEF DESCRIPTION OF THE DRAWINGS

FIG. 11 is a table showing the evaluation result information which is saved in an HDD as part of the measurement data by the color evaluation program;

FIG. 18 is a table showing adjustment and correction corresponding to deteriorating factors of color matching precision.

DESCRIPTION OF THE EMBODIMENTS

Image processing according to preferred embodiments of the present invention will be described in detail hereinafter with reference to the accompanying drawings. An image forming apparatus which reproduces colors on a print medium will be described hereinafter. Also, color reproduction devices such as a display, monitor, and the like can be evaluated based on a common concept. In other words, the present invention is not limited to evaluation of the color reproducibility of an image forming apparatus and relates to evaluation of the color reproducibility of all color reproduction devices.

First Embodiment

[Concept of Color Matching Evaluation]

Figure 1:
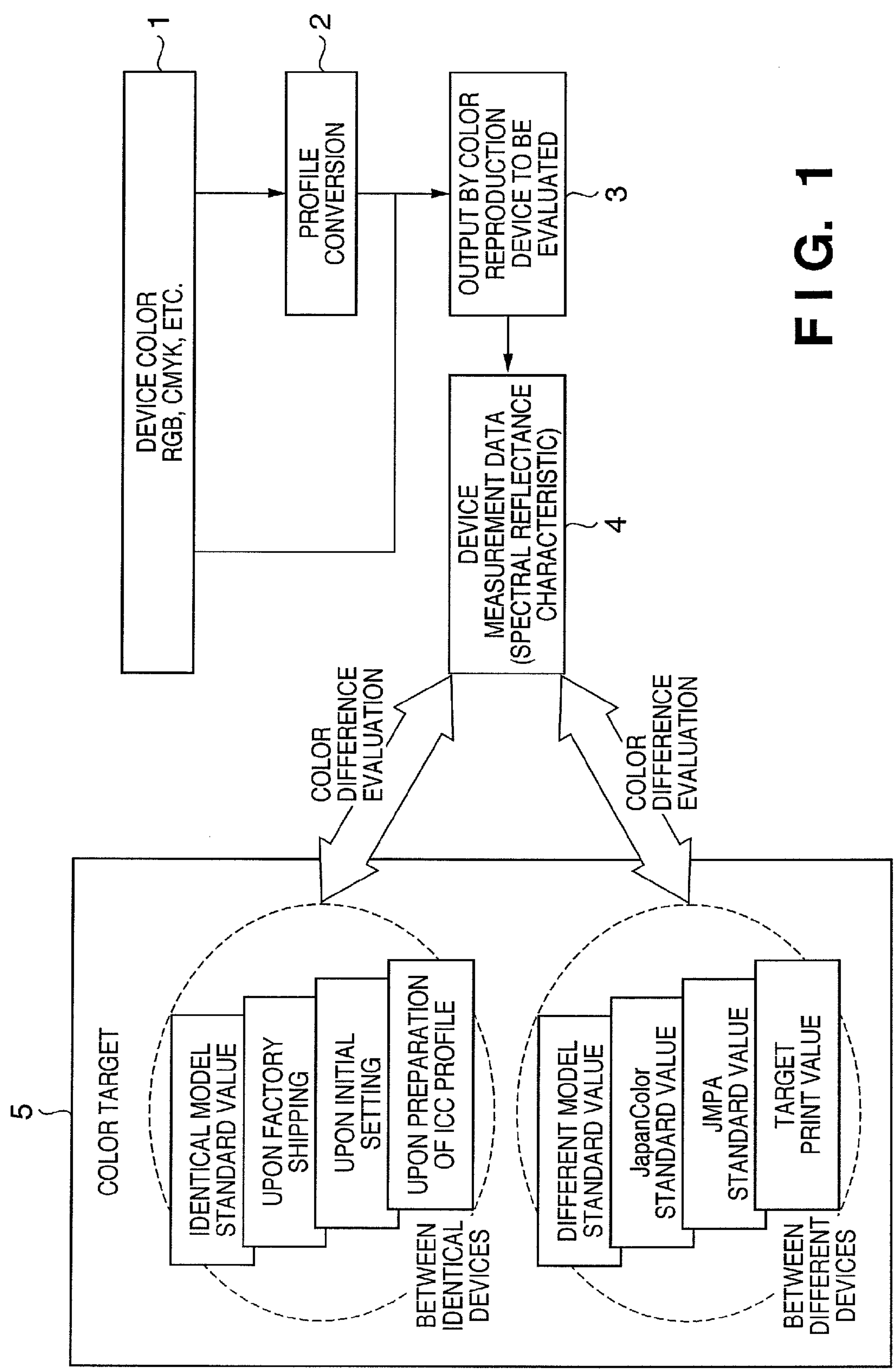
FIG. 1 is a diagram showing the concept of color matching evaluation.

FIG. 1 shows the concept of color matching evaluation.

Color matching evaluation is done as follows. That is, a device color 1 of RGB values, CMYK values, or the like is input to a color reproduction device to be evaluated (after application of color conversion 2 using an ICC profile if necessary). An output 3 (print result or display) of the color reproduction device undergoes colorimetry (its spectral reflectance characteristics are preferably measured). Then, a difference (color difference) between a calorimetric value 4 and that of a color target 5 is evaluated as color matching precision.

The color matching evaluation includes two concepts. The first concept is the degree of matching of colors between identical devices shown in the upper left part of FIG. 1, and the second concept is that of colors between different devices which have printed matter or the like as a target shown in the lower left part of FIG. 1.

In case of identical devices, the color target 5 as standard data must be defined in advance. Model standard data provided by a printer manufacturer, initial data upon factory shipping, initial data at a delivery destination of the device, measurement data upon preparation of an ICC profile, and the like can be registered as the color target 5.

On the other hand, when the user wants to reproduce print standard colors of JapanColor or JMPA (The Japanese Magazine Advertising Association), he or she acquires print measurement data which serves as the color target 5 so as to evaluate the degree of matching of colors. The colors of a color chart printed under the standard condition are measured, and are registered as the color target 5.

Note that the A2B1 (to be also called AtoB1) tag of the ICC profile is analyzed to calculate the L*a*b* values of desired CMYK data.

[Evaluation Chart]

Figure 2:
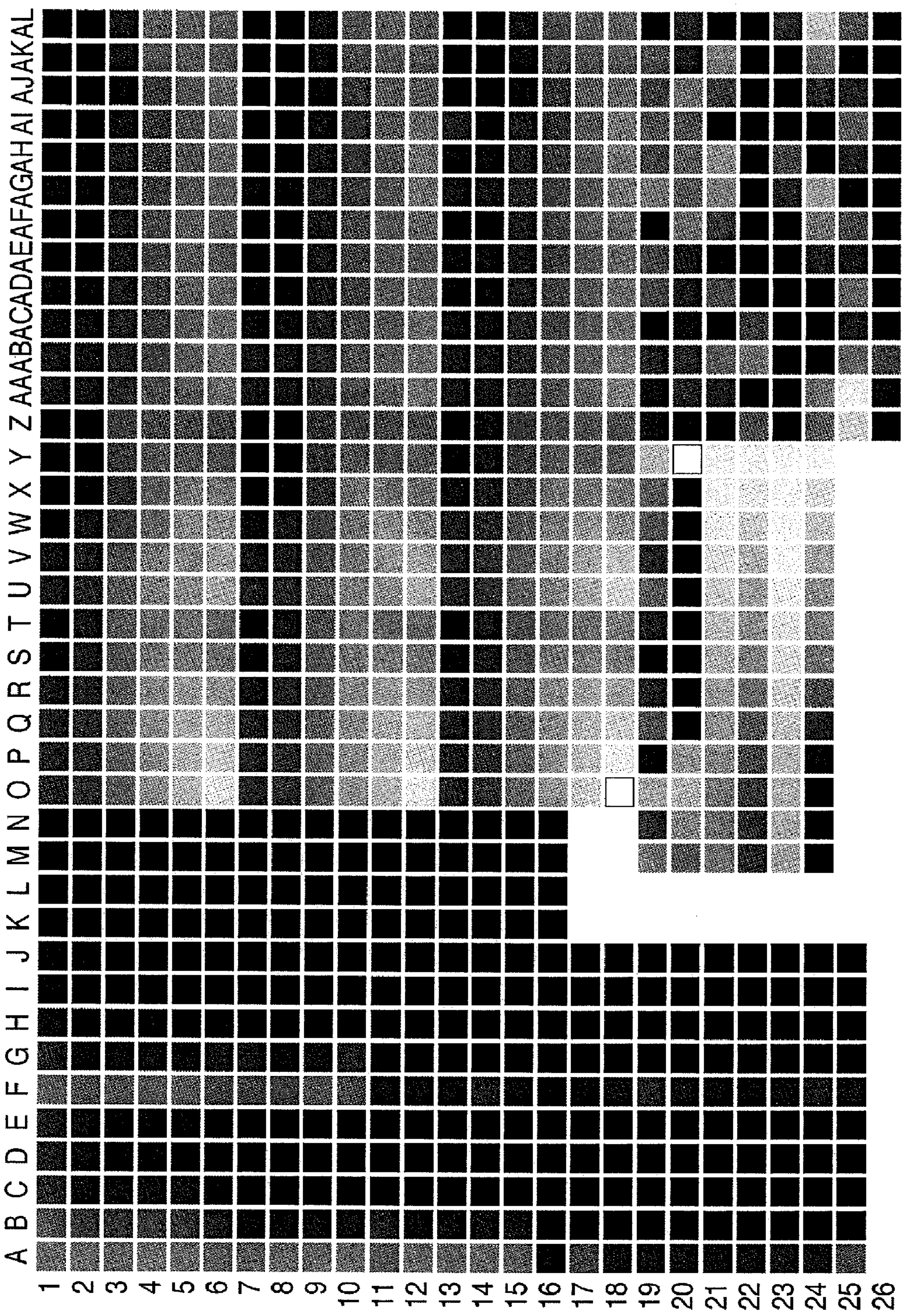
FIG. 2 shows an evaluation chart used in color matching evaluation.

FIG. 2 shows a color matching degree evaluation chart used in the color matching evaluation, and shows IT8.7/3 928 patches specified by ISO12642. The following description will be given using the 928 patches but JMPA 382 patches or user-designated patches may be used.

[System Arrangement]

Figure 3:
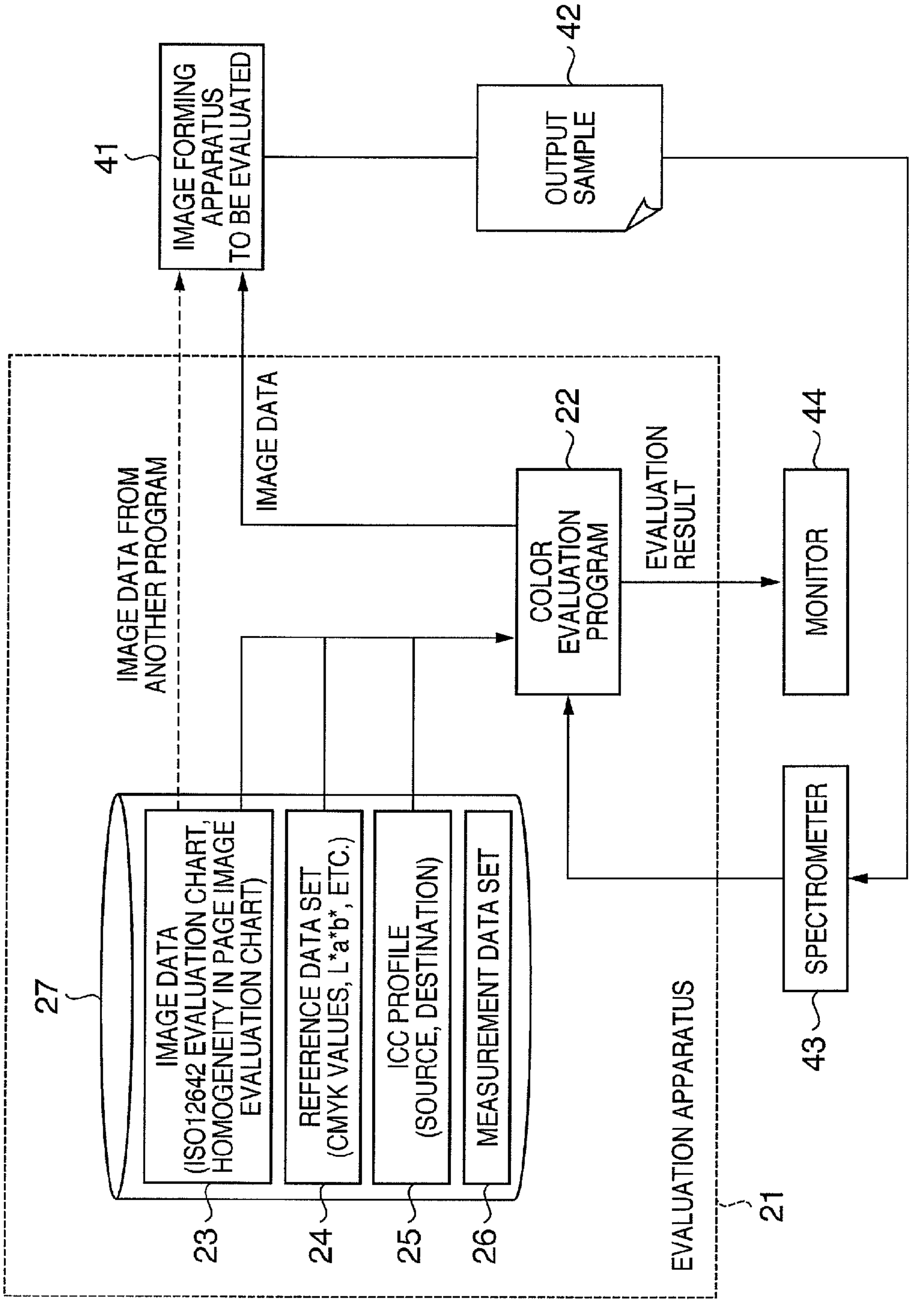
FIG. 3 is a block diagram showing the arrangement of an evaluation system according to one embodiment.

FIG. 3 shows the arrangement of an evaluation system of this embodiment.

An evaluation apparatus 21 which comprises a personal computer (PC) and the like executes a color evaluation program 22 installed in its hard disk drive (HDD) 27. The color evaluation program 22 can read out image data 23 (see FIG. 2) as an evaluation chart, a reference data set 24, an ICC profile 25, a measurement data set 26, and the like, which are stored in the HDD 27.

Figure 4:
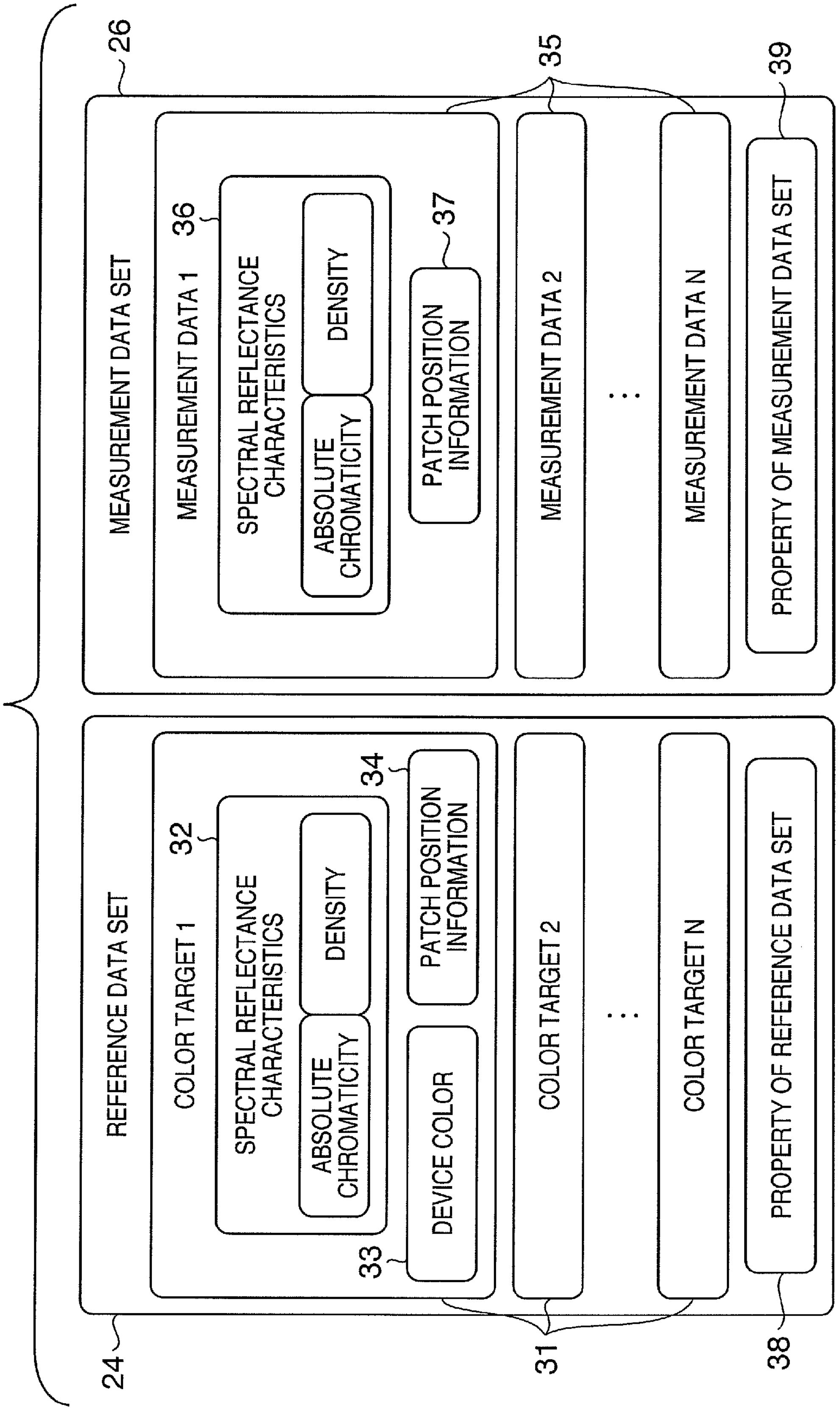
FIG. 4 shows details of a reference data set and measurement data set.

FIG. 4 shows details of the reference data set 24 and measurement data set 26. The reference data set 24 has a plurality of color targets 31. Each color target 31 includes spectral reflectance characteristics (absolute chromaticity and density) 32 of a printer to be evaluated, device color information 33 as signal values of a chart, patch position information 34, and the like in a number as large as the number of patches. The measurement data set 26 contains a plurality of measurement data 35, and each measurement data 35 includes the same data (spectral reflectance characteristics 36 and patch position information 37) except for device color information. The reference data set 24 and measurement data set 36 respectively include property information 38 and property information 39.

The evaluation apparatus 21 outputs the image data 23 to a printer (image forming apparatus) 41 to be evaluated via a predetermined interface. A spectrometer 43 which is connected to the evaluation apparatus via a predetermined interface measures the spectrum reflectance characteristics of an evaluation chart (output sample) 42. The spectrometer 43 is desirably of an automatic scan type since the number of patches is large, but the present invention is not limited to such a specific type. Furthermore, the evaluation apparatus 21 displays the evaluation result of the color evaluation program 22 on a monitor 44 which is connected via a predetermined interface.

[Color Matching Evaluation]

Figure 5:
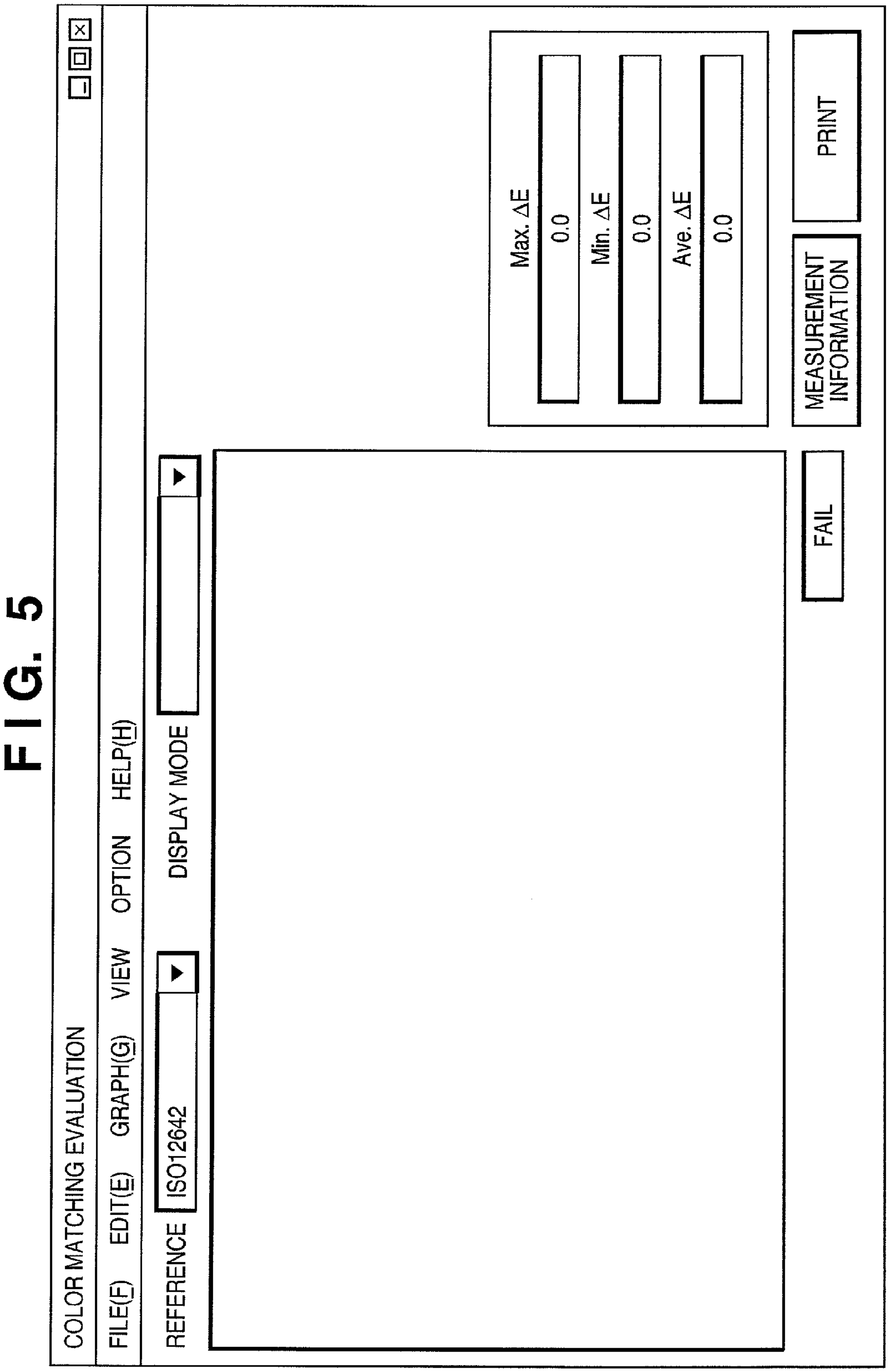
FIG. 5 shows a startup initial window of a color evaluation program.

FIG. 5 shows a startup initial window of the color evaluation program 22, which is a graphical user interface (GUI) displayed on the monitor 44. Upon executing the color matching evaluation, the user must select a color target 31 from the reference data set 24. FIG. 5 shows a state wherein the user has selected ISO12642 as the color target 31.

The color evaluation program 22 outputs, as the image data 23, device color information 33 included in the selected color target 31 to the printer 41 to be evaluated and controls the printer 41 to print an output sample 42. The spectrometer 43 measures the spectral reflectance characteristics of the output sample 42 (the evaluation chart or the like shown in FIG. 2), and inputs the measurement result as measurement data 35.

Figure 6:
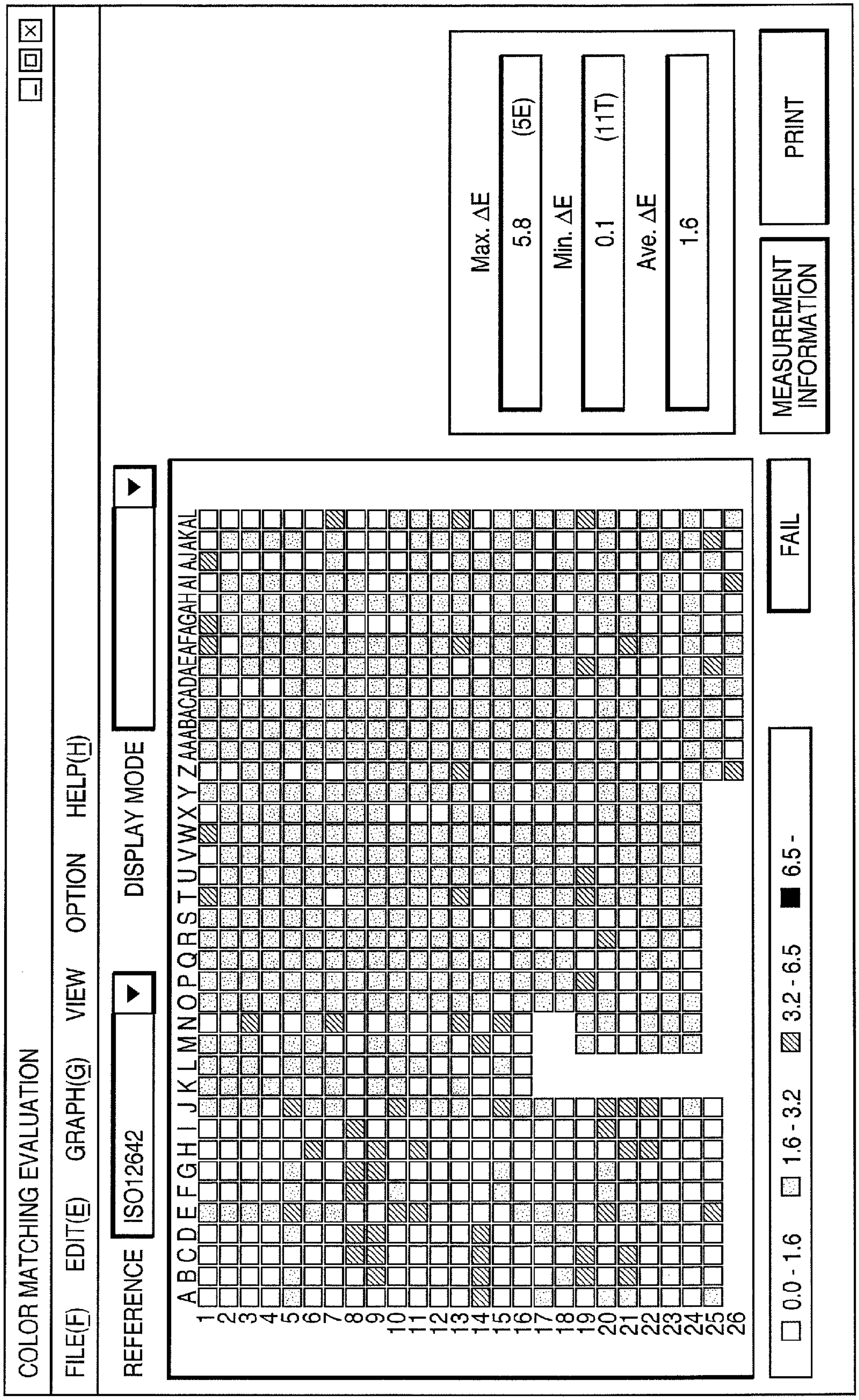
FIG. 6 shows a GUI of the measurement result of the spectral reflectance characteristics of the evaluation chart.

FIG. 6 shows a GUI of the measurement result of the spectral reflectance characteristics of the evaluation chart displayed on the monitor 44. The color evaluation program 22 displays the measurement result in the same layout as that of the patch pattern of the evaluation chart. The program 22 color-codes respective patch images in correspondence with the color differences so that the user can visually confirm the color differences between the color target and the measurement result of the printer. The program 22 displays the row numbers in the vertical direction as numeric values, and the column numbers in the horizontal direction as alphabetic letters, so that the user can specify each individual patch image (or patch) by the row and column numbers (address). That is, the program 22 calculates the color differences between the calorimetric values of patches of the evaluation chart and the corresponding calorimetric values included in the spectral reflectance characteristics 32 of the color target 31, color-codes respective patch images corresponding to the respective patches, and displays them on the GUI.

The lower left part of the window shows color codes (color difference ranges) of the patches. For example, the range 0≦color difference<1.6 is coded by aqua; 1.6≦color difference<3.2, yellow; 3.2≦color difference<6.5, orange; and 6.5≦color difference, red. The lower right part of the window displays a maximum color difference Max. ΔE, minimum color difference Min. ΔE, and average color difference Ave. ΔE of all the 928 patches. Furthermore, a FAIL/PASS display field is assured on the lower right part of the window, and displays "FAIL" or "PASS" according to a threshold set by the user. That is, if the color matching precision of the printer 41 to be evaluated falls within a predetermined permissible range, the program 22 displays "PASS" in the FAIL/PASS display field; otherwise, it displays "FAIL" in that field.

Note that the color difference ΔE is calculated as the three-dimensional distance of absolute chromaticity coordinates L*a*b* by:

$$\Delta E=\sqrt{\{(Lr-Lm)^2+(ar-am)^2+(br-bm)^2\}} \quad (1)$$

where L*a*b* is the absolute color space propounded by the CIE (Commission Internationale de l'Eclairage), Lr, ar, and br are the color target data of the reference data set 24, and Lm, am, and bm are measurement data of the sample output 42.

[Homogeneity in Page Image Evaluation]

The homogeneity in page image evaluation is a scheme for quantitatively evaluating the degrees of color and density variations at a plurality of positions in an image formed on a print medium based on an identical signal value. The first embodiment sets the central position of that image as a reference and evaluates the degree of color difference based on the chromaticity value of the central position. For this reason, the homogeneity in page image evaluation does not require any data like the color target 31 used in the color matching evaluation. The first embodiment uses the chromaticity value at the central position in the image (in page image) as a reference but may use an average chromaticity value or a chromaticity value at an arbitrary position as a reference.

The color evaluation program 22 reads out the image data 23 of a homogeneity in page image evaluation chart from the HDD 27, outputs it to the printer 41 to be evaluated, and controls the printer 41 to print the homogeneity in page image evaluation chart (output sample 42).

Figure 7:
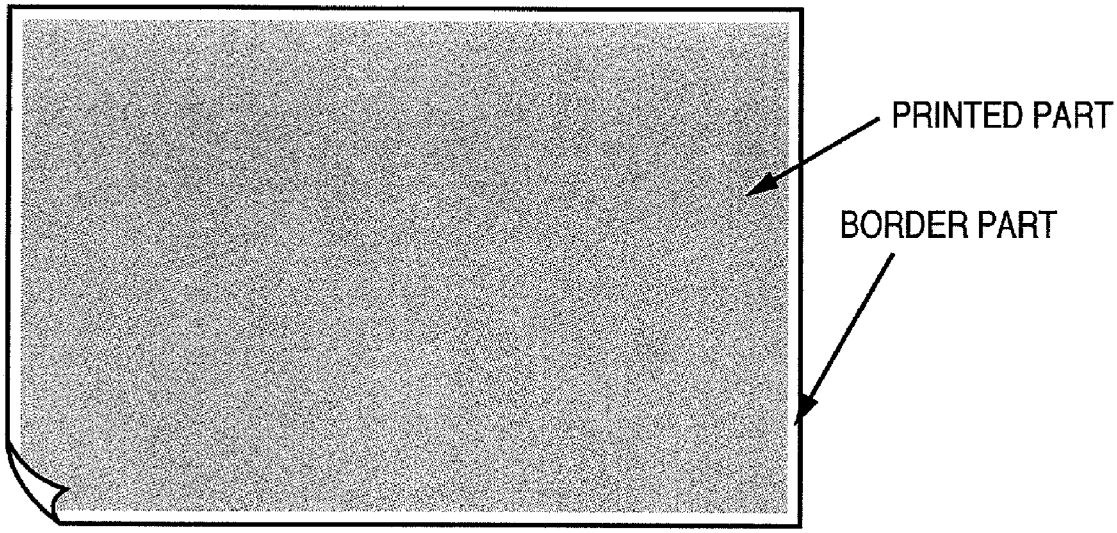
FIG. 7 shows an example of a uniform density pattern.

FIG. 7 shows an example of a uniform density pattern used as the homogeneity in page image evaluation chart. The first embodiment prints grayscale data defined by C, M, and Y tone values=20% on a print part. Note that FIG. 7 shows the print part and a border part. However, if a printer which can make borderless printing is used, the border part may be omitted. FIG. 7 shows an example in which an identical density pattern is formed on nearly the entire page. Alternatively, an identical density pattern may be selectively formed within a range to be evaluated or near a measurement point.

The color evaluation program 22 measures the spectral reflectance characteristics of the output sample 42 (homogeneity evaluation chart shown in FIG. 7) using the spectrometer 43, and inputs the measurement result. The first embodiment sets a color at nearly the center of the homogeneity evaluation chart as a reference, calculates the color difference between that reference color and a color at another point in page image based on the measured values, and uses the calculated color difference as an evaluation result.

Figure 8:
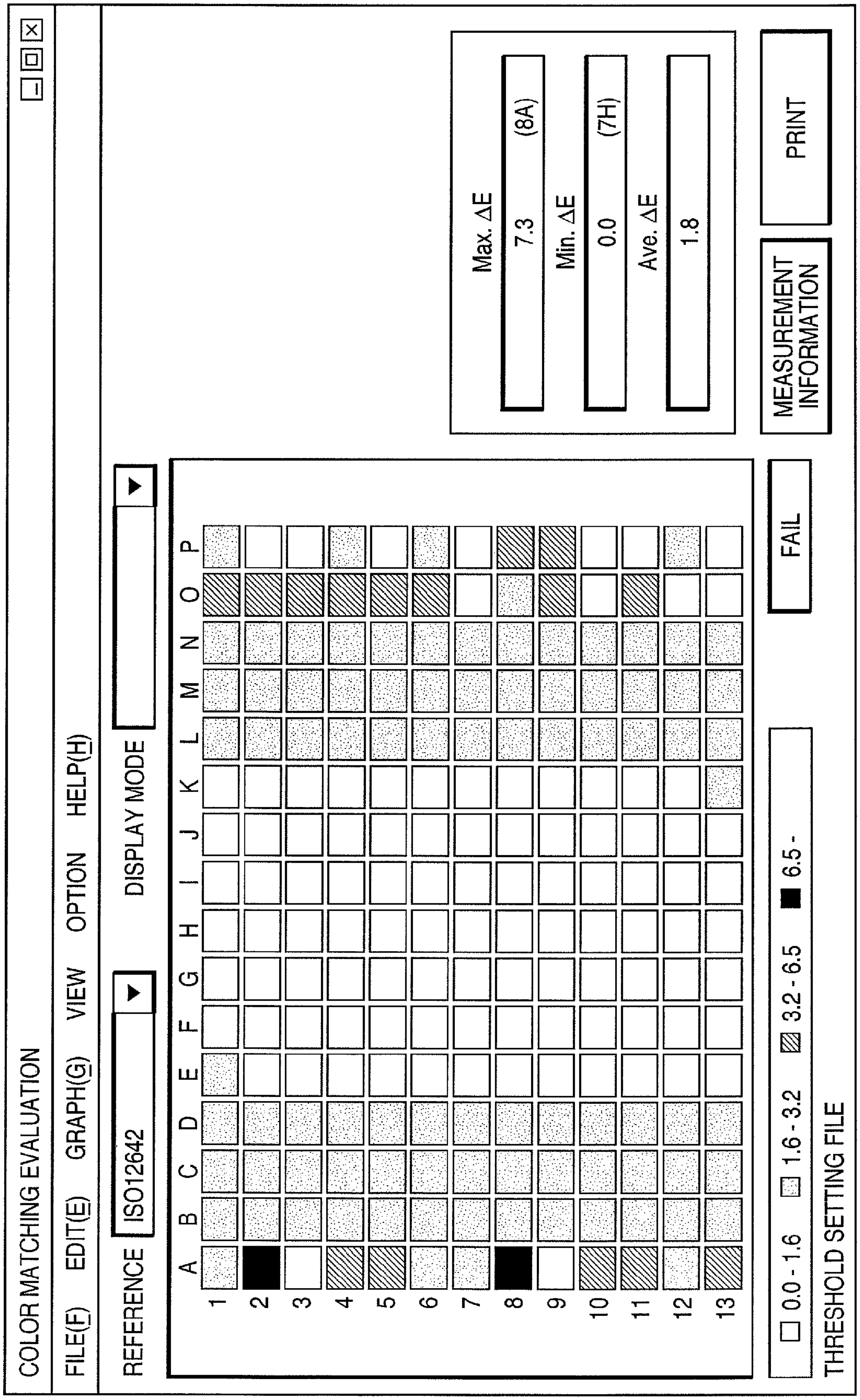
FIG. 8 shows a GUI of the homogeneity in page image evaluation result of a homogeneity evaluation chart.

FIG. 8 shows a GUI of the homogeneity in page image evaluation result of the homogeneity evaluation chart displayed on the monitor 44. The color evaluation program 22 displays the measurement result using a layout which segments an area of the evaluation chart into segments of appropriate sizes (13 rows×16 columns in the example of FIG. 8). The program 22 color-codes images in the respective segments according to heterogeneity (color differences) so that the user can visually confirm approximate heterogeneity (color differences) on the monitor 44. The program 22 displays the row numbers in the vertical direction as numeric values, and the column numbers in the horizontal direction as alphabetic letters, so that the user can specify each individual segment image (or segment) by the row and column numbers (address). That is, the program 22 calculates the color differences between the calorimetric values (at nearly the centers) of the respective segments of the homogeneity in page image evaluation chart and the reference value (the calorimetric vale at-nearly the center of the homogeneity evaluation chart), color-codes respective segment images corresponding to the respective segments, and displays them on the GUI.

The lower left part of the window shows color codes (color difference ranges) of the segments. For example, the range 0≦color difference<1.6 is coded by aqua; 1.6≦color difference<3.2, yellow; 3.2≦color difference<6.5, orange; and 6.5≦color difference, red. The lower right part of the window displays a maximum color difference Max. ΔE, minimum color difference Min. ΔE, and average color difference Ave. ΔE of all the segments. Furthermore, a FAIL/PASS display field is assured on the lower right part of the window, and displays “FAIL” or “PASS” according to a threshold set by the user. That is, if the homogeneity in page image of the printer 41 to be evaluated falls within a predetermined permissible range, the program 22 displays “PASS” in the FAIL/PASS display field; otherwise, it displays “FAIL” in that field.

[Color Matching Evaluation Sequence]

Figure 9A:
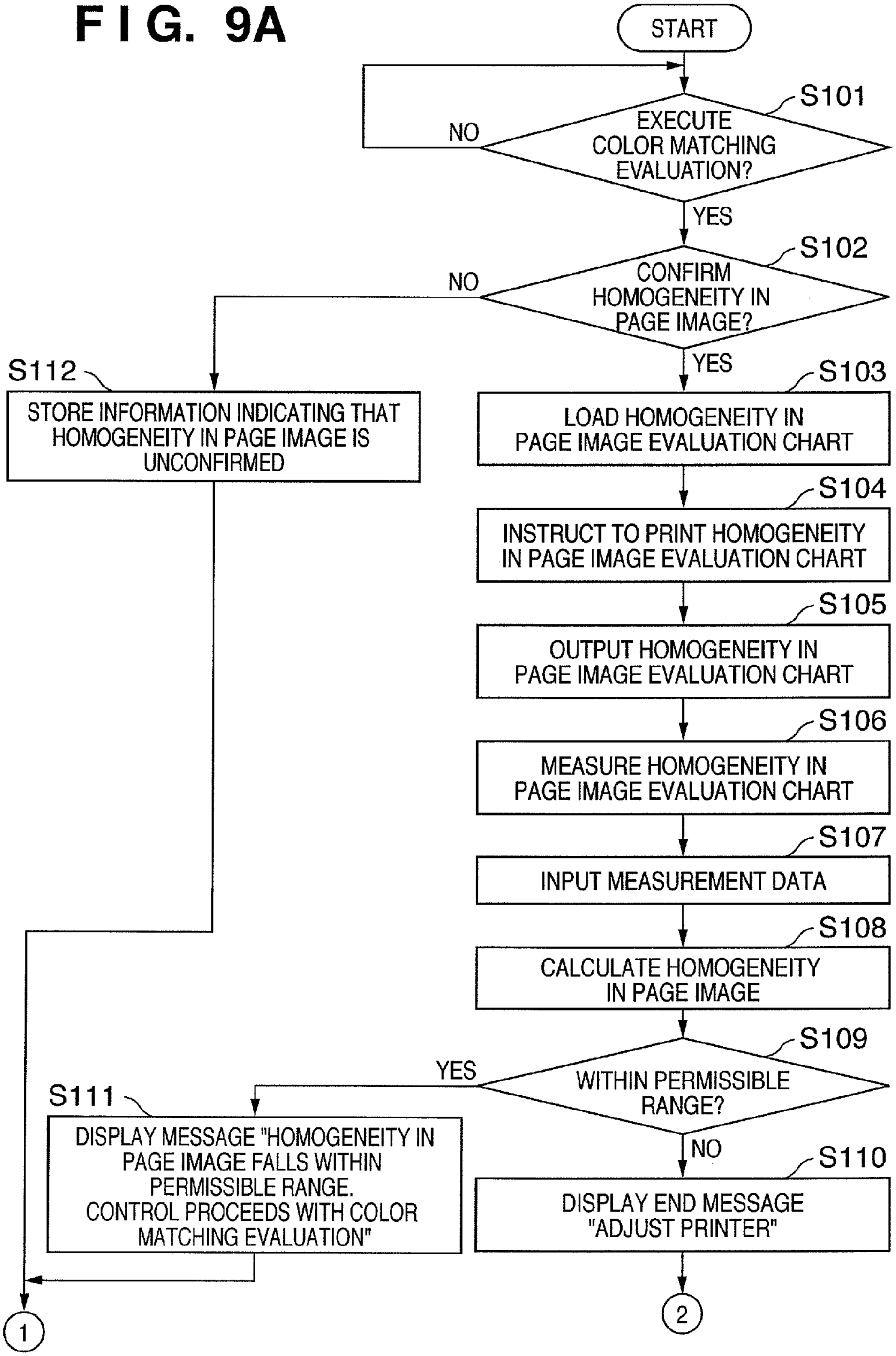
FIGS. 9A and 9B are flowcharts showing the color matching evaluation sequence by the evaluation system.
Figure 9B:
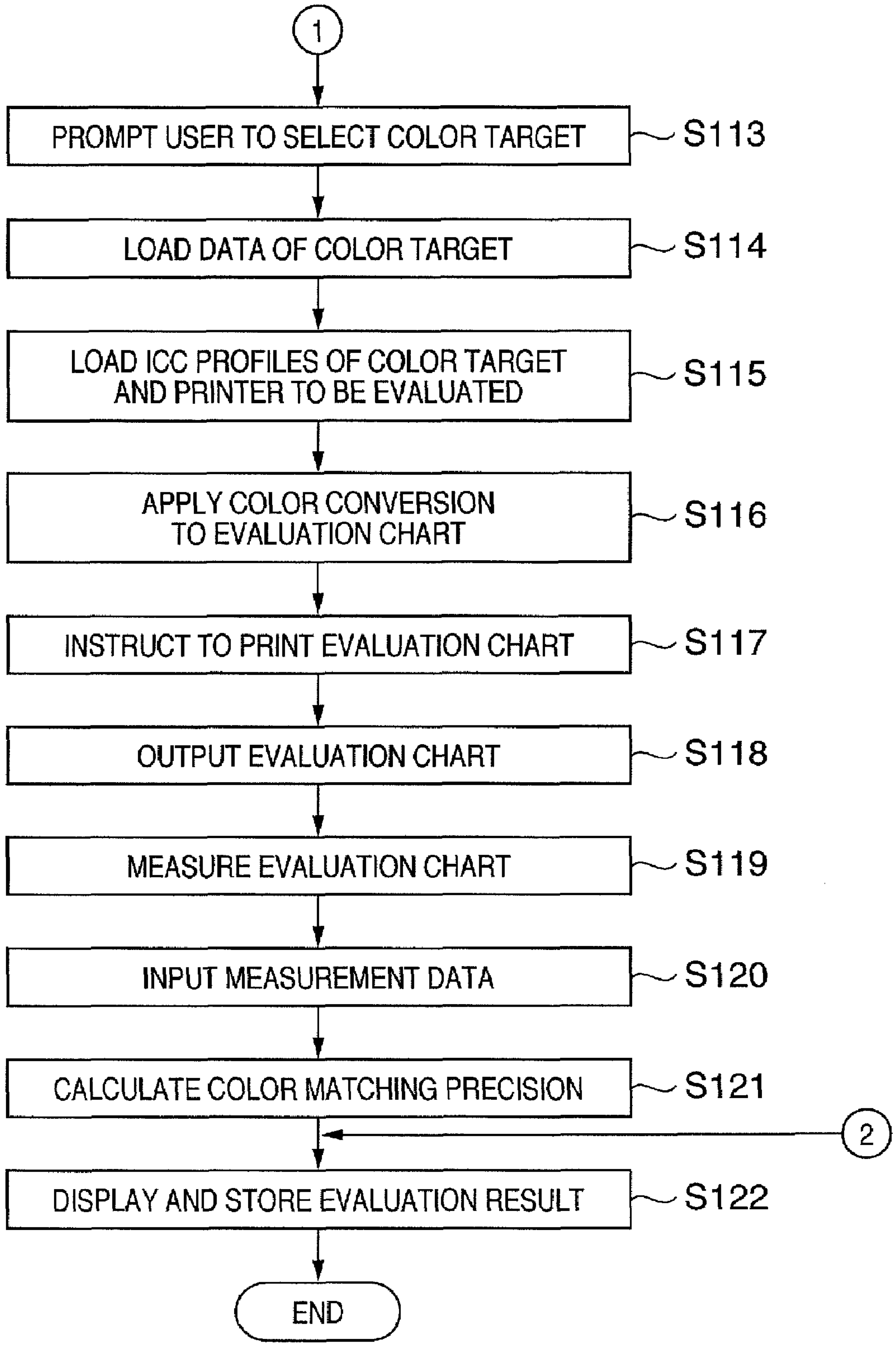

FIGS. 9A and 9B are flowcharts showing the color matching evaluation sequence by the evaluation system.

Upon reception of an execution instruction of the color matching evaluation (S101), the color evaluation program 22 accepts an instruction indicating whether or not the user wants to confirm homogeneity in page image (S102).

If the user gives the instruction to evaluate the homogeneity in page image, the color evaluation program 22 loads the image data 23 of the homogeneity in page image evaluation chart from the HDD 27 (S103). The program 22 instructs the printer 41 to be evaluated to print the homogeneity in page image evaluation chart (S104), and outputs the homogeneity in page image evaluation chart to the printer 41 (S105). In this case, the program 22 does not apply any color conversion using an ICC profile or the like.

When the user sets the homogeneity in page image evaluation chart (output sample 42) output from the printer 41 on the spectrometer 43, the color evaluation program 22 controls the spectrometer 43 to measure the spectral reflectance of the homogeneity in page image evaluation chart (S106). The program 22 receives the measured data (S107), and calculates the homogeneity in page image (S108).

The color evaluation program 22 determines “pass” or “fail”, i.e., it checks based on the conditions set in advance by the user if the homogeneity in page image falls within a permissible range (S109). If the homogeneity in page image falls outside the permissible range, the program 22 displays an end message (e.g., “Adjust the printer”) on the monitor 44 (S110), and prompts the user to adjust the printer. If the homogeneity in page image falls within the permissible range, the program 22 displays an OK message (e.g., “The homogeneity in page image falls within the permissible range. The control proceeds with color matching evaluation” (S111), and starts the color matching evaluation.

Figure 10:
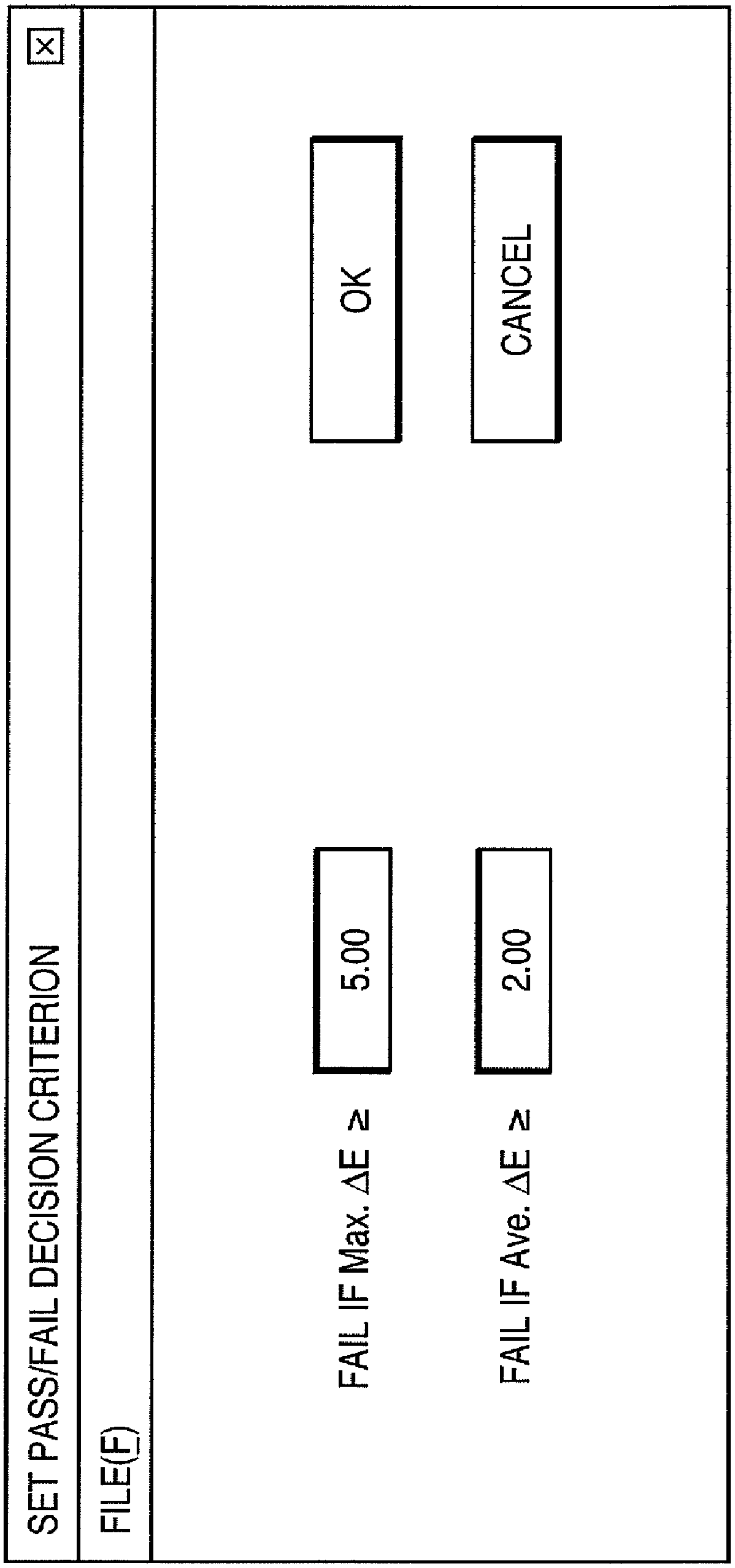
FIG. 10 shows a dialog used to set reference values of homogeneity in page image, which dialog is provided by the color evaluation program.

FIG. 10 shows a dialog used to set reference values (permissible range) for “pass”/“fail” determination of the homogeneity in page image, which dialog is provided by the color evaluation program 22. This dialog allows the user to set the average value Ave. ΔE and maximum value Max. ΔE of the color difference. When at least one of the average value Ave. ΔE and maximum value Max. ΔE of the evaluation result exceeds the reference value, the color evaluation program 22 determines that the homogeneity in page image falls outside the permissible range (“fail”) and the process advances to step S110.

If the homogeneity in page image is not confirmed according to the user’s instruction, the color evaluation program 22 stores information indicating that the homogeneity in page image is unconfirmed (S112).

Next, the color evaluation program 22 starts the color matching evaluation. The program 22 prompts the user to select a color target 31 (S113). If there is a plurality of printers to be evaluated, the program 22 prompts the user to select a printer to be evaluated in step S113.

The color evaluation program 22 loads data of the selected color target 31 from the HDD 27 (S114), and also an ICC profile of the color target 31 and that of the printer 41 to be evaluated (S115). The program 22 color-converts target CMYK values of the evaluation chart (the device color information 33 of the color target) into device CMYK values of the printer 41 using these two ICC profiles (S116). Note that the color evaluation program 22 need not execute this color conversion, and may control another color processing program, an image rendering controller connected to the printer 41, a print server, or the like to execute the color conversion.

The color evaluation program 22 instructs the printer 41 to print the evaluation chart (S117), and outputs the evaluation chart after the color conversion to the printer 41 (S118).

When the user sets the evaluation chart (output sample 42) output from the printer 41 on the spectrometer 43, the color evaluation program 22 controls the spectrometer 43 to measure the spectral reflectance of the evaluation chart (S119). The program 22 receives the measured data (colorimetric data associated with the spectral reflectance) (S120), and calculates color matching precision (S121). This calculation computes the color differences (color matching precision) of respective patches by comparing the spectral reflectance characteristics 32 of the color target 31 loaded in step S114 with the measurement result.

The color evaluation program 22 displays the evaluation result of the color matching precision, and stores the evaluation results of the homogeneity in page image and color matching precision in the HDD 27 as measurement data 35 (S122). This display includes the color difference ranges of the 928 patches of the evaluation chart, the maximum color difference Max. ΔE, the minimum color difference Min. ΔE, the average color difference Ave. ΔE, and the pass/fail determination result, as shown in FIG. 6.

[Storage of Evaluation Result]

FIG. 11 shows evaluation result information which is stored in the HDD 27 as part of the measurement data 35 by the color evaluation program 22.

The color evaluation program 22 records the determination result, maximum color difference MAX_ΔE, minimum color difference MIN_ΔE, and average color difference AVE_ΔE in association with the homogeneity in page image. Also, the program 22 records the maximum color difference MAX_ΔE, minimum color difference MIN_ΔE, and average color difference AVE_ΔE in association with the color matching precision. Furthermore, the program 22 records DATE indicating an evaluation date, TESTER indicating a tester, REFERENCE_MODEL indicating a color conversion target, and DESTINATION_MODEL indicating a device to be evaluated. Moreover, the program 22 records INSTRUMENT indicating a measuring instrument, ILLUMINANT indicating the color temperature of an illuminant, VISUAL_FIELD indicating a visual field of measurement, FILTER_STATUS indicating filter conditions, and the like as measurement conditions.

The printer 41 which is prompted to be adjusted in step S110 must undergo adjustment to attain uniform homogeneity in page image. Normally, the color evaluation program 22 notifies a service person to conduct adjustment. Alternatively, the program 22 generates an N-dimensional lookup table (LUT) based on the measurement points and measured data (differences) of the homogeneity in page image to execute shading correction, thus correcting heterogeneity in page image as much as possible. Alternatively, the program 22 may display the evaluation result on the monitor 44 and may promptly notify a service spot of the necessity for adjustment of the homogeneity in page image via a public network or the Internet. In this manner, an immediate measure can be taken without troubling the user.

FIG. 9B has exemplified evaluation of color matching precision by printing the evaluation chart that has undergone the color conversion using the ICC profiles of the color target and printer 41. However, when the user wants to acquire data such as calibration precision between identical models, a difference from a standard machine, changes over time from factory shipping, and the like, the color conversion is not required. The evaluation chart is printed without color conversion, and its printout is measured by the spectrometer 43. Then, reference data and measured data can be compared. In other words, the present invention is not limited to the color conversion scheme using ICC profiles, and can evaluate the degree of matching of colors under various conditions.

As described above, according to the first embodiment, the color evaluation program can independently measure and evaluate the color matching precision and homogeneity in page image. If the homogeneity in page image falls outside the permissible range, the program prompts the user to adjust the color reproduction device. If the homogeneity in page image falls within the permissible range but the color matching precision is low, ICC profiles may be re-prepared. Loss of time that results from stopping the processes which use the color reproduction device by re-preparing ICC profiles without reason tan be prevented. Of course, loss of time resulting from preparing ICC profiles in a state wherein the color reproduction device is far removed from its normal state can also be prevented.

Second Embodiment

Image processing according to the second embodiment of the present invention will be described hereinafter. Note that the same reference numerals in the second embodiment denote the same parts as in the first embodiment, and a detailed description thereof will be omitted.

[Overview]

The color matching evaluation of the first embodiment is suited to confirm the homogeneity in page image, and to determine whether or not to adjust the color reproduction device. The color chart of ISO12642 covers the CMYK color space, and is excellent in confirming the color matching precision of the entire gamut.

However, depending on the application of the printed matter, the tendencies of all colors need not be determined, and it is often important to precisely learn the tendencies specific interest colors. The interest colors include, e.g., a corporate color, flesh color of a model, process black (black obtained by mixing C, M, and Y) which is hard to reproduce, and the like. Of course, the color chart of ISO12642 also includes such interest colors. However, it is difficult for the color matching evaluation of the first embodiment to determine the degree of influence of the homogeneity in page image on the patch of the interest color.

To solve this problem, as the second embodiment, color matching evaluation added with a function of analyzing the degree of influence of the homogeneity in page image on the patch of the interest color will be explained.

The color matching evaluation of the second embodiment reveals whether or not the degree of matching of the user's interest color, i.e., the color difference is caused by color matching imprecision or the problem of homogeneity in page image. The color difference production factor of the user's interest color is clarified, and reference information indicating what to adjust is provided to the user.

[Evaluation Chart]

In the second embodiment, it is important to analyze each individual patch in the printed chart. For this reason, the measurement points of the homogeneity in page image are set to have one-to-one correspondence with those of the color matching precision. Thus, the degree of dependency of the color matching precision of the interest color (patch) on the color difference of the homogeneity in page image is accurately grasped.

Note that the same evaluation chart and homogeneity in page image evaluation chart as those in the first embodiment are used. Therefore, the following explanation will be given under the assumption that a uniform chart of C, M, and Y=20% is used as the homogeneity in page image evaluation chart, and the ISO12642 928 patches are used as the evaluation chart. However, the first embodiment evaluates the homogeneity in page image using the segments of 13 rows×16 columns, as shown in FIG. 8. However, the second embodiment adopts the same segments as in the ISO12642 928 patches, and uses matched measurement positions. That is, the segments of 26 rows×38 columns (total of 988 segments) shown in FIG. 6 are measured. Note that 60 patches which are not included in the ISO12642 928 patches are measured, and the maximum color difference Max. ΔE, minimum color difference Min. ΔE, and average color difference Ave. ΔE, which are described in the first embodiment, are calculated together with the 928 patches.

[Color Matching Evaluation Sequence]

This sequence is substantially the same as that in the flowcharts of FIGS. 9A and 9B. Note that the window display contents of the evaluation result in step S122 are changed.

The second embodiment uses equation (2) to calculate a color difference ΔEu of the homogeneity in page image. Also, this embodiment uses equation (3) to calculate the color difference ΔE of the color matching precision.

$$\Delta Eux = \sqrt{(Cc - Cx)^2} \qquad (2)$$

where ΔEux is the color difference of segment x,

Cc is the chromaticity value at the center of the chart, and

Cx is the chromaticity value of segment x.

$$\Delta Ecp=\sqrt{(Ct-Cp)^2} \quad (3)$$

where ΔEcp is the color difference of patch p,

Ct is the chromaticity value of a target, and

Cp is the chromaticity value of patch p.

The second embodiment displays the color differences calculated using equations (2) and (3), and also calculates and displays a color difference ΔEm of color matching to make the user intuitively understand the degree of influence of the homogeneity in page image on the color difference of that patch using:

$$\Delta Emp=\Delta Ecp-\Delta Eup \quad (4)$$

where ΔEmp is the color difference of color matching corresponding to patch p, and ΔEup is the color difference of the homogeneity in page image corresponding to patch p.

With the above calculations and display contents, the user can easily grasp the color difference ΔEm of color matching, in other words, pure color matching precision (color difference) for each patch. Of course, patch images which are obtained by color-coding the color differences ΔEm of color matching in correspondence with their ranges can also be displayed. The user can determine with reference to the color difference ΔEm of color matching whether or not the color matching precision is close to its limit or need for improvement remains.

Figure 12:
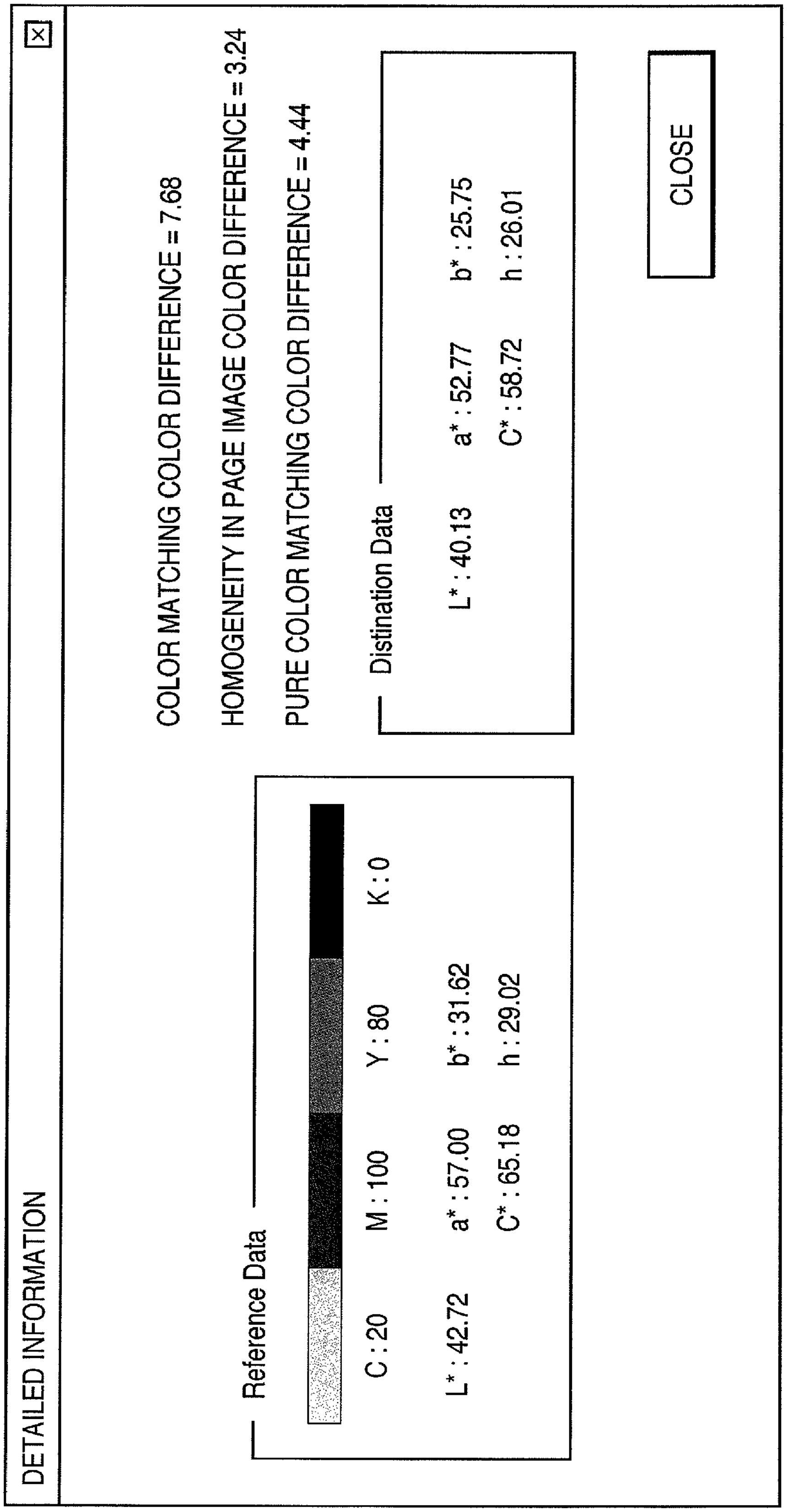
FIG. 12 shows an example of detailed information displayed upon double-clicking a patch image shown in FIG. 6.

FIG. 12 shows an example of detailed information which is displayed upon double-clicking a patch image displayed on the monitor shown in FIG. 6 by a pointing device such as a mouse or the like. The user makes a decision about the interest color based on the displayed detailed information of the interest color (patch).

For example, in in considering the measurement errors of the measuring instrument, the stability of an image forming apparatus, the number of grids and interpolation calculations of an ICC profile, and the like, if the color difference ΔEm of color matching<1, there is no need to re-prepare the ICC profile. In order to further improve the color matching precision, the image forming apparatus should be adjusted to reduce heterogeneity in page image rather than re-preparation of the ICC profile.

On the other hand, if the color difference ΔEm of color matching>3, the ICC profile should be changed after some output conditions are changed. The change in output condition may include adjustments that change colors such as adjustment of the maximum density, redoing the calibration, a change in print medium to smoother coat paper to broaden the color gamut, and the like. Basically, it is important for improvement of the color-matching precision to adjust the characteristics and image forming conditions of the image forming apparatus.

Equation (4) describes a calculation equation of the color difference ΔEm of color matching attained by subtracting the color difference Eup of the homogeneity in page image from the color difference Ecp of the patch. Alternatively, the color difference ΔEm of color matching may be expressed by a ratio given by:

$$Ru=Eup/Ecp\times100\ [\%] \quad (5)$$

That is, equation (5) represents the ratio of the color difference Eu of the homogeneity in page image included in color matching precision Ec. The color matching precision Ec can be expressed by a calculation equation that indicates the degree of influence of the homogeneity in page image or the including ratio of the influence of the homogeneity in page image. In other words, the calculations and display method that allow for separation of the factors of color matching precision can be used.

In this way, the measurement points of the homogeneity in page image are matched with those (patches) of the color matching precision. Then, the presence of the factors of the homogeneity in page image in the color matching precision of the interest patch is recognized, and that information is provided to the user. The user can quickly determine based on that information whether the homogeneity in page image is to be adjusted or the ICC profile is to be re-prepared by changing the output conditions.

In the above description, upon measuring the homogeneity in page image evaluation chart, the same position as the measurement position of the color matching precision is measured. Alternatively, broader measurement intervals may be set (or they may be thinned out). The chromaticity (measured value) at a non-measured position may be estimated from actually measured values using linear interpolation. Note that it is desirable to calculate color differences at positions where no patch measurement for the homogeneity in page image is made so that the measurement points of the homogeneity in page image have one-to-one correspondence with those of the color matching precision.

Third Embodiment

Image processing according to the third embodiment of the present invention will be described hereinafter. Note that the same reference numerals in the third embodiment denote the same parts as in the first and second embodiments, and a detailed description thereof will be omitted.

[Overview]

The first and second embodiments have explained an example in which the homogeneity in page image evaluation chart defined by the tone values of C, M, and Y=20% is output. However, even when the tone values=20% are set, the output density (the relationship between the tone values and density; to be referred to as "tone reproducibility" hereinafter) changes within the range from about 0.1 to 0.4 depending on the models, print schemes, and the like of printers. This change does not pose any problem since the target exists in the calculation of the color matching precision. However, upon evaluating the homogeneity in page image, since the density at the central portion is used as a reference, different density ranges are evaluated according to the models, print schemes, and the like of printers. Comparison of the color differences in different density ranges makes subjective evaluation difficult. The color reproducibility of a printer improves with increasing density. In general, it is most difficult to output an extremely highlighted region which may appear in a photo of a white wedding dress. This is because the color changes using extremely small color material amounts.

Difficulty in color reproduction of the extremely highlighted region will be described in more detail below.

Figure 13:
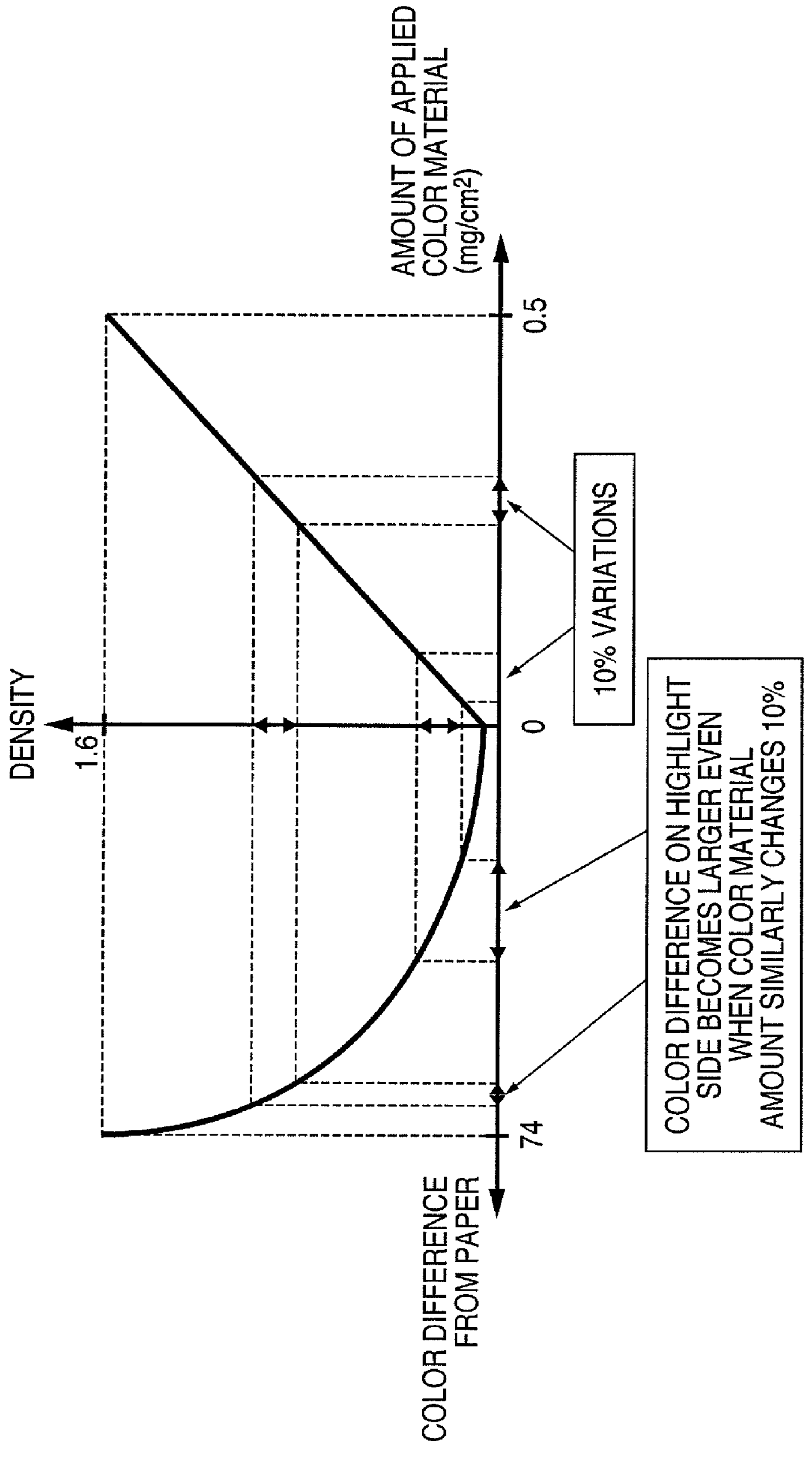
FIG. 13 is a graph showing the relationship among the color material amount, density, and color difference.

The present inventors examined the relationship between the color material amount and density, and also the relationship between the paper and color difference. FIG. 13 is a graph showing the relationship among the color material amount, density, and color difference. On the right side of the graph, the abscissa plots the amount of applied color material, and the ordinate plots the density. On the left side of the graph, the ordinate plots the density, and the abscissa plots the color difference from the paper surface.

If the amount of applied color material changes 10%, since the amount of applied color material and density have a linear relationship, as shown in the extremely highlighted region and a halftone region in FIG. 13, a 10% density change takes place irrespective of the density region.

However, as shown in FIG. 13, the density and color difference do not have a linear relationship. That is, even when the amounts of applied color material (color material amounts) are changed equally in different density regions, the density regions have different color differences, and the color difference on the highlighted side becomes larger. Note that the evaluation values changed according to the density regions even in identical models. That is, even when the change in color material amount remains the same, the degree of change in color differs depending on the density regions. For this reason, a demand has arisen for making the output density as constant as possible.

The third embodiment will explain a method of evaluating the homogeneity in page image more precisely by adopting an output method of the homogeneity in page image evaluation chart different from the first and second embodiments.

[Method of Matching Chromaticity]

Upon reception of a homogeneity in page image evaluation instruction, the color evaluation program 22 confirms the description contents of an ICC profile to be evaluated. More specifically, the program 22 calculates L*a*b* values obtained upon increasing the tone values of C, M, and Y plain colors by 10% from grid information included in the ICC profile with reference to an A2B1 tag that describes CMYK to L*a*b* information. The program 22 calculates saturation values Cd upon increasing the tone values by 10% from the respective L*a*b* values using:

$$Cd=\sqrt{(ad^{*2}+bd^{*2})} \quad (6)$$

where ad* and bd* are the chromaticity values at a tone value of d %.

Figure 14:
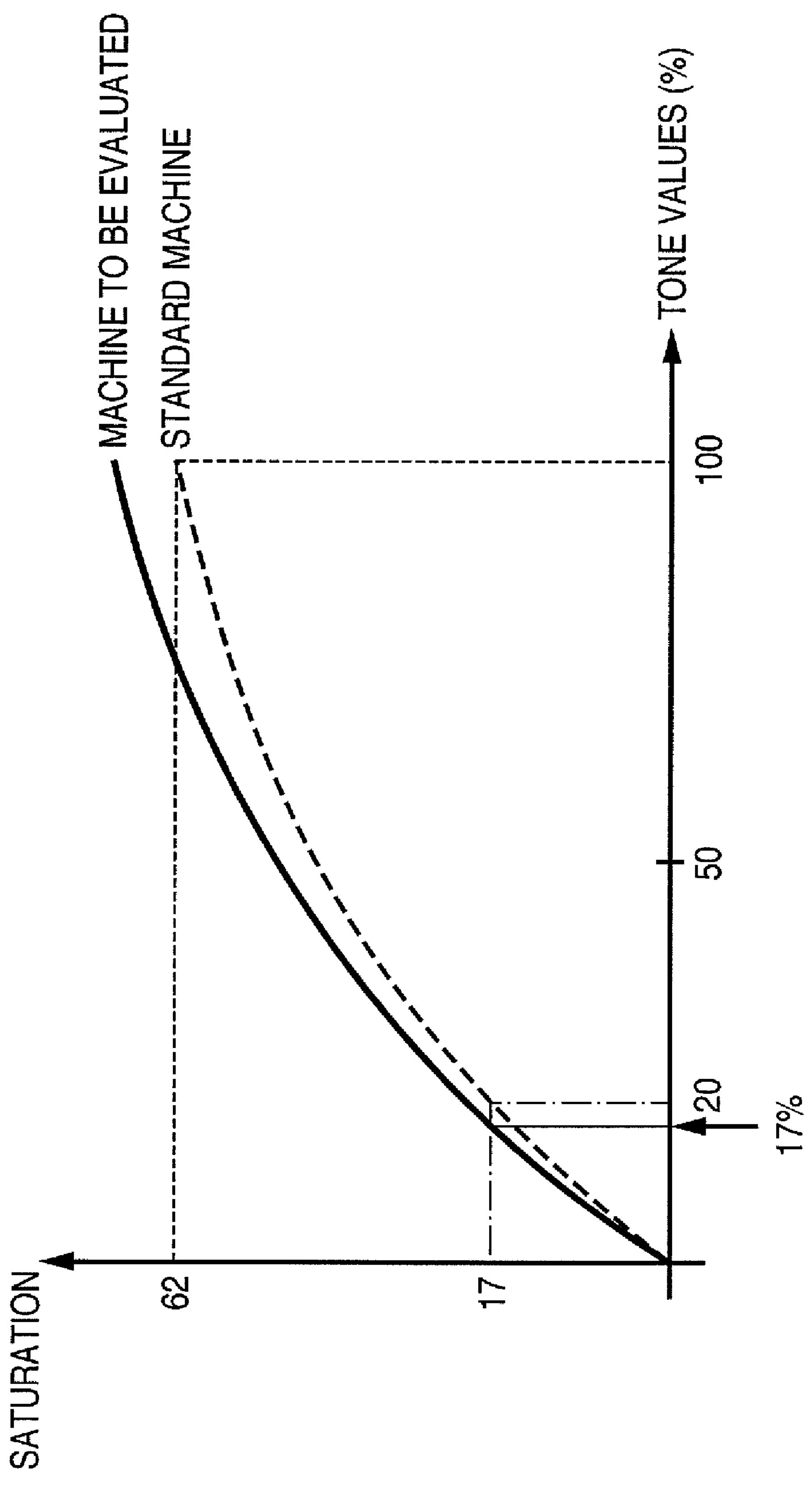
FIG. 14 is a graph showing the relationship between the tone values and saturation C of cyan.
Figure 15A:
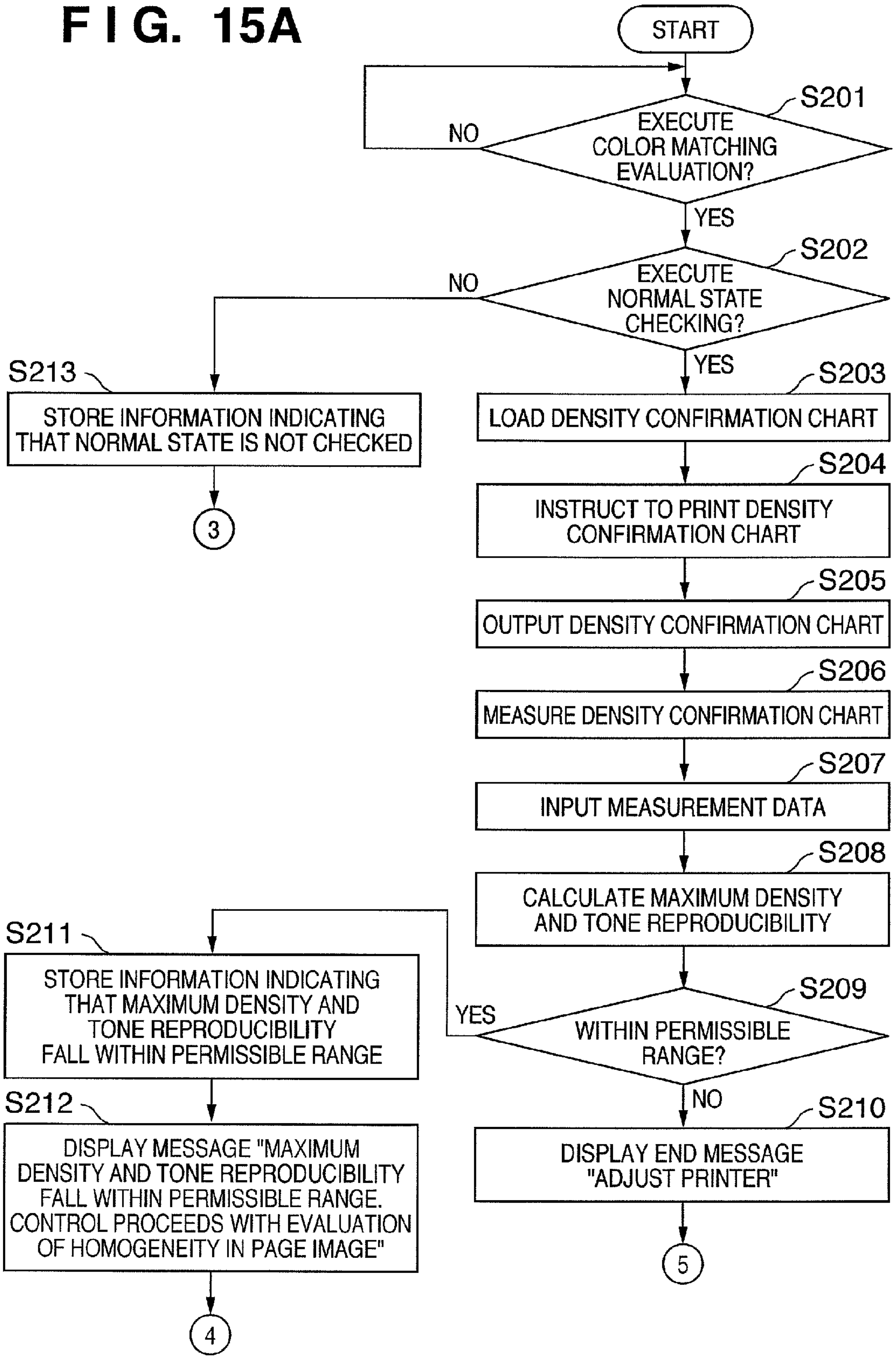
FIGS. 15A to 15D are flowcharts showing the processing sequence of the fourth embodiment.
Figure 15B:
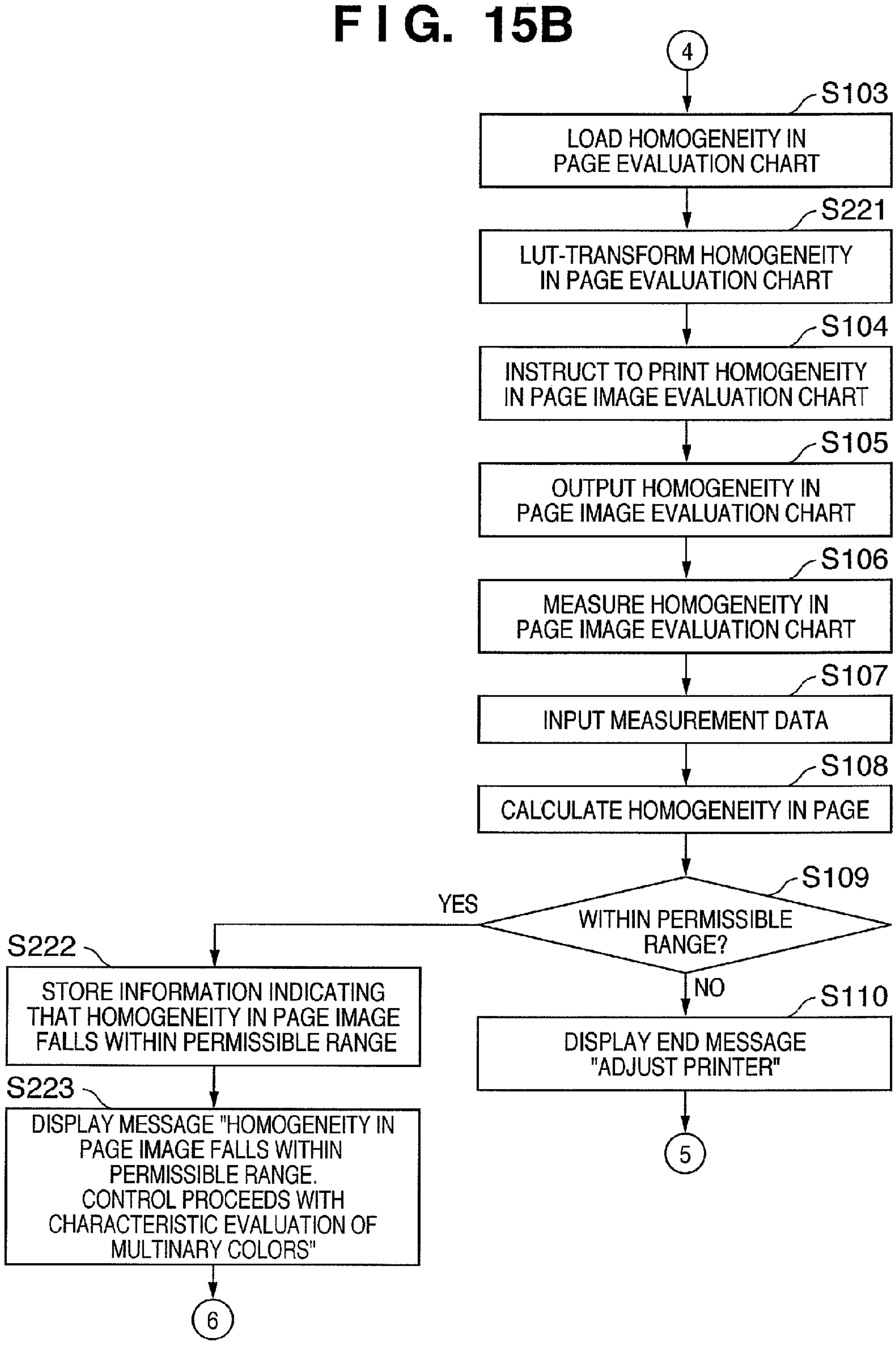
Figure 15C:
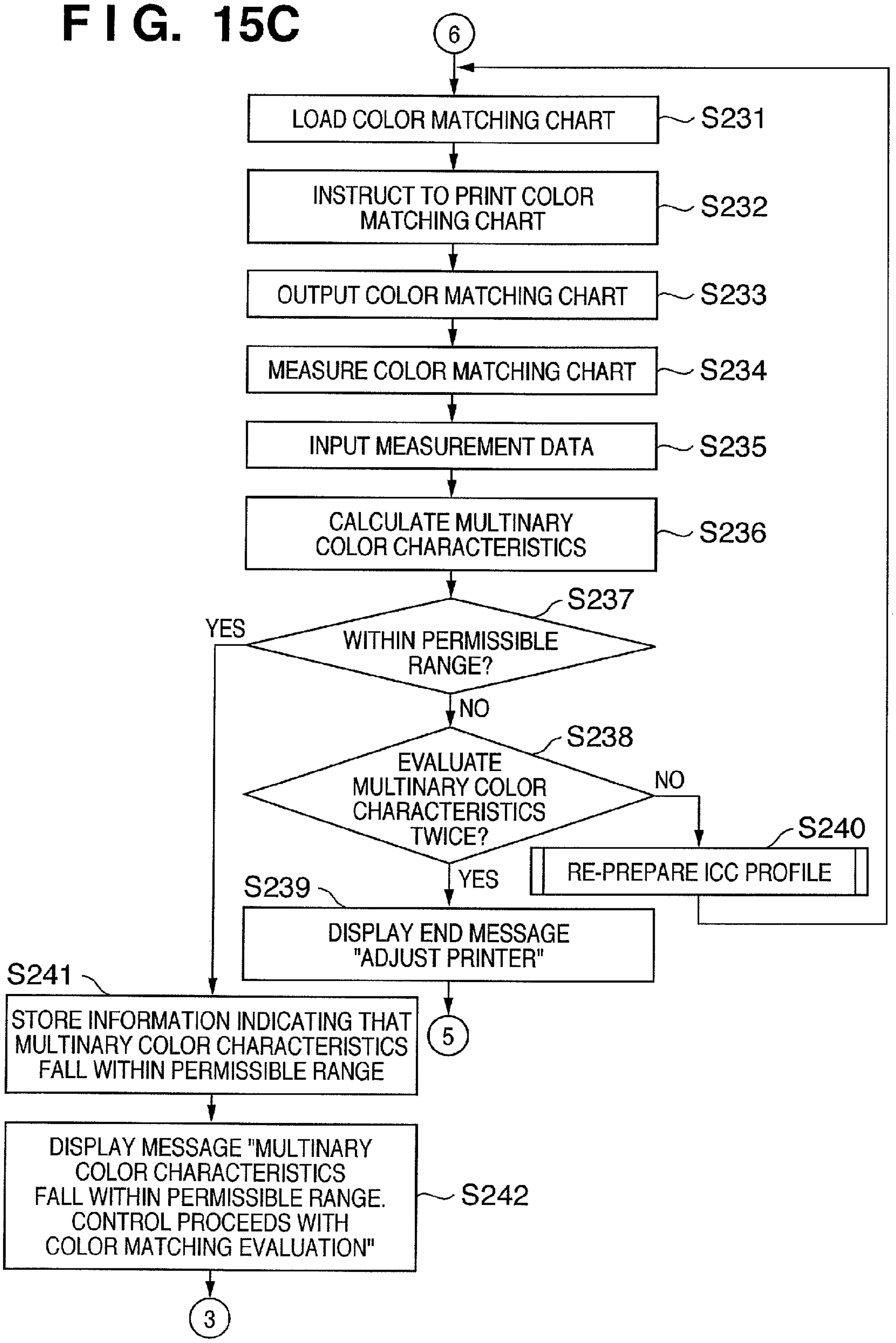
Figure 15D:
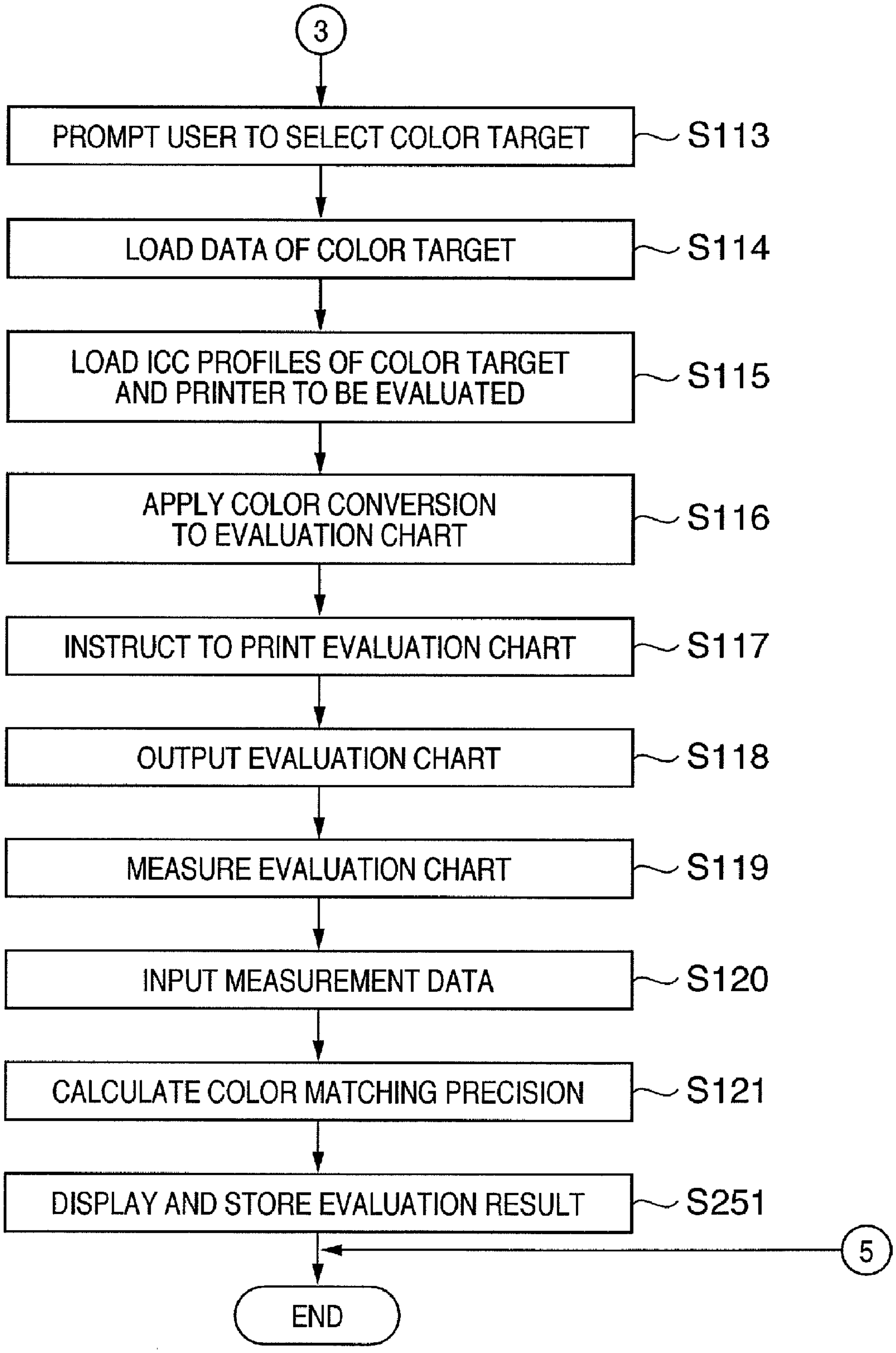

FIG. 14 shows the relationship between the tone values and saturation C of cyan. In FIG. 14, the abscissa plots the tone values, and the ordinate plots saturation C. The broken curve in FIG. 14 represents the characteristics of a printer as a standard machine, and the solid curve represents those of the printer 41 to be evaluated.

Upon evaluating the homogeneity in page image by defining C, M, Y colors by the tone values=20%, the tone value of cyan of the printer 41 to be evaluated, which exhibits saturation C equivalent to the image having the tone value=20% of cyan of the standard machine only needs to be determined. According to the characteristics shown in FIG. 14, as the determination result, the tone value=17% of cyan in the printer 41 to be evaluated corresponds to the tone value=20% of the standard machine. Likewise, when the tone values of magenta and cyan are determined, the magenta tone value=20% and yellow tone value 16% are obtained.

Based on the aforementioned relationship, data that prints a CMY-mixed gray chart which is defined by C, M, and Y tone values=17%, 20%, and 16% is output to the printer 41 to be evaluated to print the CMY-mixed gray chart. In this way, the homogeneity in page image evaluation chart having the same chromaticity value as that of an image defined by C, M, and Y tone values=20% in the standard machine can be obtained. Using this chart, the homogeneity in page image can be evaluated in the same density region as that of the standard machine.

Fourth Embodiment

Image processing according to the fourth embodiment of the present invention will be described hereinafter. Note that the same reference numerals in the fourth embodiment denote the same parts as in the first to third embodiments, and a detailed description thereof will be omitted.

[Overview]

An image forming apparatus makes various kinds of control to maintain a normal state. This control can be basically classified into "adjustment of a maximum density" and "adjustment of tone reproducibility" although it depends on the models. These adjustments make the output characteristics of plain color constant. However, even when the maximum density and tone reproducibility are adjusted, if color reproduction of multinary colors of secondary colors or higher obtained by mixing C, M, and Y is unknown, it is impossible to attain color matching. Hence, an ICC profile is required to implement color matching.

The ICC profile can be roughly classified into two types. The first type is an ICC profile which is attached by a printer manufacturer. The second type is an ICC profile uniquely prepared by the user. The format profile describes the color reproduction characteristics of a standard machine assumed by the manufacturer, and the latter profile describes those of multinary colors of the user's image forming apparatus.

The ICC profile provided by the manufacturer considers versatility, tone reproducibility, and the like. However; strictly speaking, since individual image forming apparatuses have different color reproduction characteristics of multinary colors, high color matching precision cannot be expected based on the ICC profile provided by the manufacturer. On the other hand, since the ICC profile uniquely prepared by the user is prepared by outputting a color chart by the image forming apparatus to be evaluated, high color matching precision can be expected. However, preparation of an ICC profile requires a large work volume. Of course, if the color reproduction characteristics of multinary colors in the user's image forming apparatus are close to those of the standard machine assumed by the manufacturer, high color matching precision can be obtained, and an ICC profile need not be uniquely prepared. On the other hand, when the color reproduction characteristics of multinary colors are far removed from those of the standard machine, it is indispensable to prepare an ICC profile to improve the color matching precision.

Upon preparing an ICC profile to adjust the color reproduction characteristics of multinary colors, it is nonsense to prepare an ICC profile unless the engine of the image forming apparatus of interest is in a normal state. Since the ICC profile reflects the state of the image forming apparatus at the time of preparation, the standard must be set to keep the state of the image forming apparatus unchanged after preparation. Preparation of an ICC profile requires at least about 30 minutes of work since it includes output of a color chart, colorimetry of the color chart, calculations of an LUT, installation of a profile in a printer controller, and the like. If such work is repeated, printing halts during that interval, incurring a large loss of time Factors causing a drop in color matching precision include other factors in addition to homogeneity in page image. The fourth embodiment classifies the factors causing a drop in color matching precision so as to allow easy determination of relevant factors. That is, prior to preparation of an ICC profile, it is checked if the printer 41 to be evaluated is in a normal state.

[Processing Sequence]

FIGS. 15A to 15D are flowcharts showing the processing sequence of the fourth embodiment. The color evaluation program 22 executes this processing.

Check Normal State

Upon reception of an execution instruction of color matching evaluation (S201), the color evaluation program 22 checks if the printer 41 to be evaluated is in a normal state (S202). It is required to check the normal state upon re-preparing an ICC profile. Therefore, it is preferable to check the normal state. Upon reception of a normal state check instruction, the process enters processing for confirming the maximum density and tone reproducibility.

The color evaluation program 22 loads a density confirmation chart stored in advance in the HDD 27 (S203). The program 22 instructs the printer 41 to be evaluated to print the density confirmation chart (S204), and outputs the density confirmation chart to the printer 41 (S205). In this case, the program 22 does not apply any color conversion or the like using the ICC profile as in a case of outputting the homogeneity in page image evaluation chart.

Figure 16:
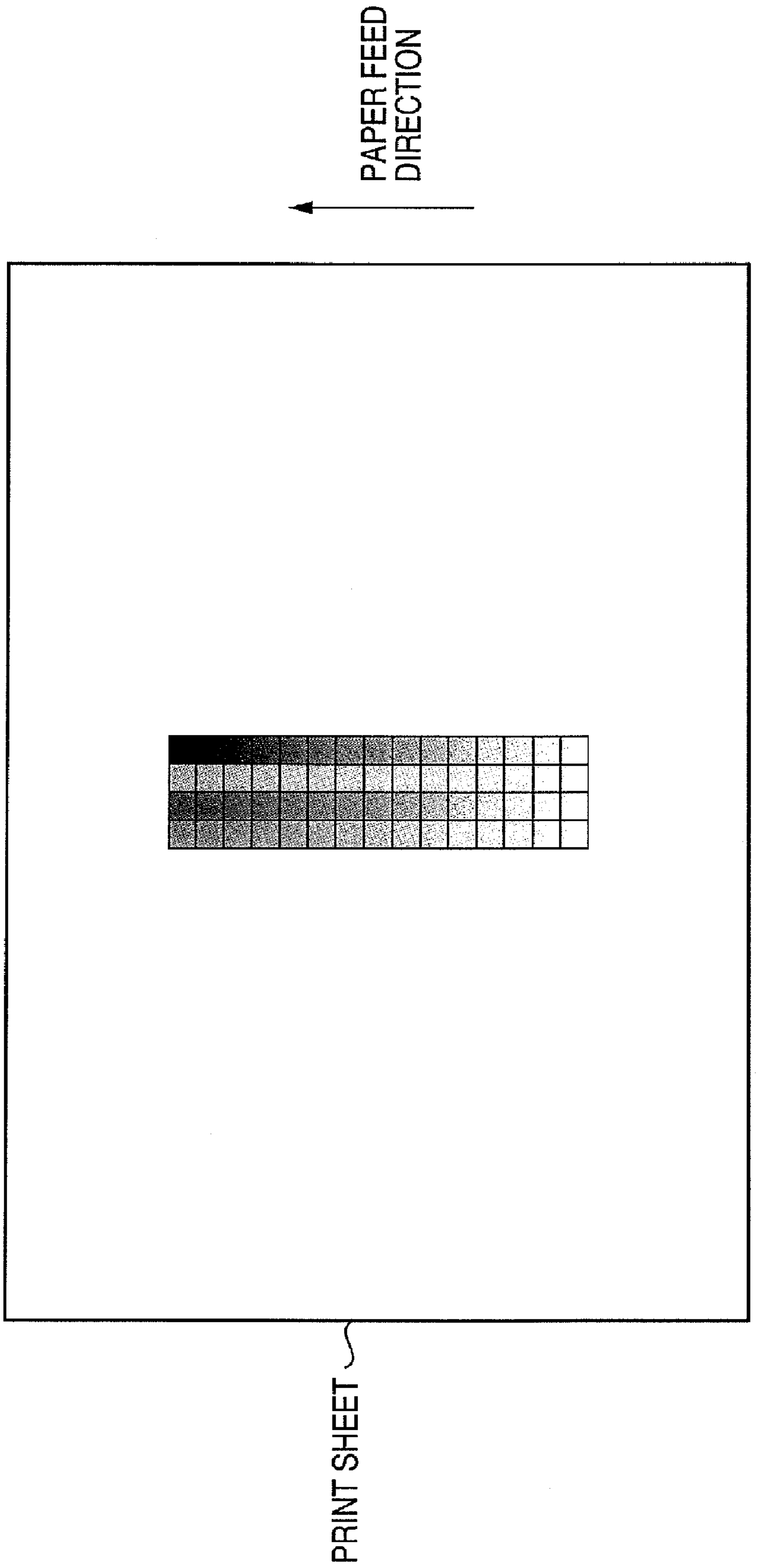
FIG. 16 shows an example of a density confirmation chart.

FIG. 16 shows an example of the density confirmation chart, which is defined by patches of plain color grayscale values (the tone values=0, 3, 7, 10, 15, 20, 25, 30, 40, 50, 60, 70, 80, 90, and 100%). Each patch size has one side of, e.g., 8 mm, and the chart is centered as much as possible on the print medium. This is to avoid the influence of heterogeneity in page image since the homogeneity in page image is not evaluated yet.

When the user sets the density confirmation chart (output sample 42) output from the printer 41 on the spectrometer 43, the color evaluation program 22 controls the spectrometer 43 to measure the spectral reflectance of the density confirmation chart (S206). The program 22 receives the measured data (S207), and calculates the maximum density and tone reproducibility (S208).

The color evaluation program 22 makes a decision to pass or fail by checking whether or not the maximum density and tone reproducibility fall within a permissible range (S209). Note that the fourth embodiment sets a permissible range so that the absolute values of density variations with respect to a target density value fall within the range (target density× 0.07±0.01). 7% approximately represents a change of ΔE=2, and 0.01 makes an allowance for errors of the measuring instrument. Alternatively, the maximum density and tone reproducibility may be checked using a color difference in place of the density value. Of course, upon using the spectrometer, the measured data can be converted into either a density value or chromaticity value such as L*a*b* or the like. Note that the calculation conditions of the chromaticity and density can use conditions: D50, 2° visual field, and status T. Other conditions of the spectrometer include, e.g., an angle of incident light=45°, a light receiving angle=0°, and the background (also called backing) of the spectrometer=black.

If it is determined that the maximum density and tone reproducibility fall outside the permissible range, the color evaluation program 22 displays an end message (e.g., "Adjust printer") on the monitor 44 (S210), thus prompting the user to adjust the printer. If it is determined that the maximum density and tone reproducibility fall within the permissible range, the program 22 stores information indicating that the maximum density and tone reproducibility fall within the permissible range (S211) and displays an OK message (e.g., "Maximum density and tone reproducibility fall within permissible range. The control proceeds with evaluation of homogeneity in page images") (S212). The program then starts evaluation of the homogeneity in page image. If the color evaluation program 22 does not execute the normal state checking processing according to a user's instruction, it stores information indicating that the normal state checking result is not confirmed (S213).

Evaluation of Homogeneity in Page Image

If the color evaluation program 22 determines that the normal state checking result passes, it starts evaluation of the homogeneity in page image. Note that the evaluation of the homogeneity in page image is substantially the same as the processing in steps S103 to Sill shown in FIG. 9A. Therefore, steps different from the processing in steps S103 to S111 shown in FIG. 9A will be explained. The same step numbers in FIG. 15B denote the same steps, and a detailed description thereof will be omitted.

The color evaluation program 22 loads the homogeneity in page image evaluation chart (S103), and performs transformation using a lookup table (LUT) so as to reproduce the homogeneity in page image evaluation chart to have a constant density (S221).

The LUT transformation is linear signal transformation that transforms a plain color signal. In consideration of the relationship (tone reproducibility) between the tone values and density obtained upon evaluation of the tone reproducibility, the same density (color) as the problem to be solved by the third embodiment can be output. In the example of the third embodiment, the ICC profile is loaded. However, since the fourth embodiment confirms the tone reproducibility before evaluation of the homogeneity in page image, the tone values which allow for obtaining a desired density are recognized.

Figure 17:
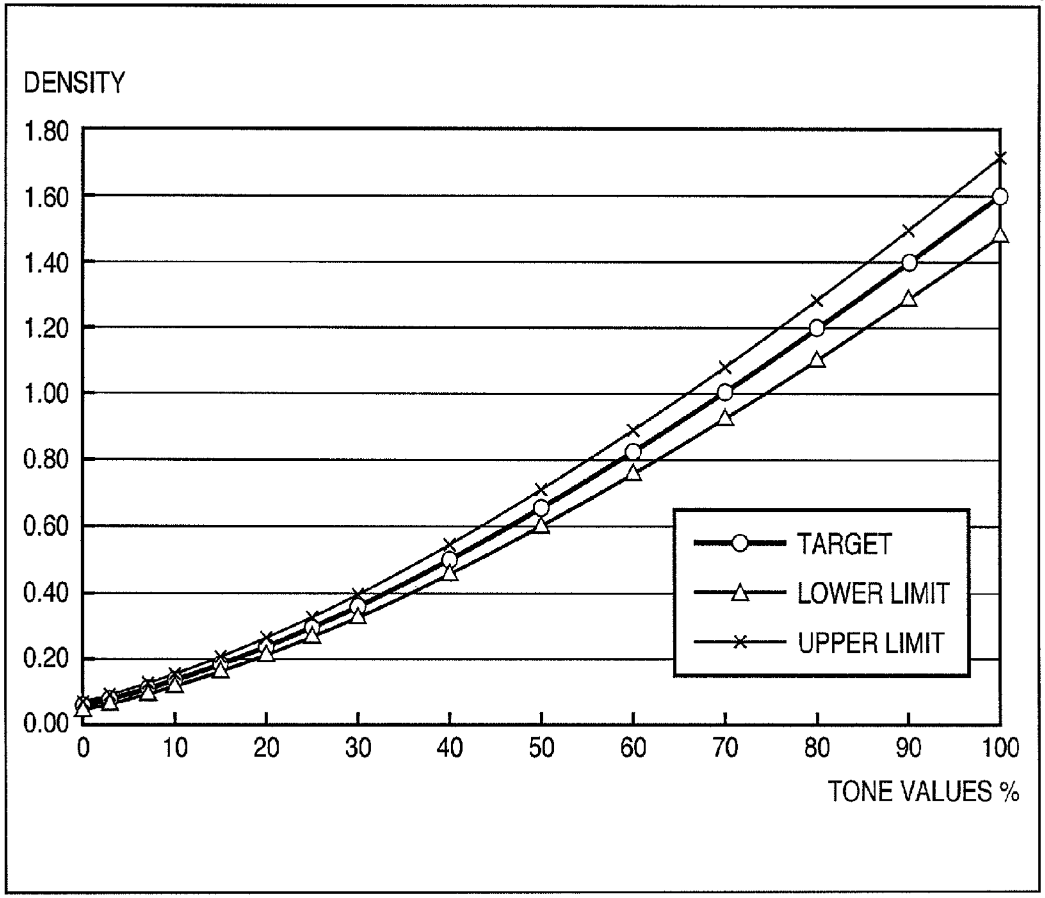
FIG. 17 shows an example of the relationship between the tone reproducibility and reference values (targets)

FIG. 17 shows an example of the relationship between the tone reproducibility and reference value (target).

The target density (indicated by a ○ mark) at a tone value=20% is 0.23, as shown in FIG. 17. Therefore, when the tone reproducibility is barely equal to the lower limit of the permissible range (indicated by a Δ mark), a tone value that yields the density=0.23 is calculated from the tone characteristics of the lower limit. In the example shown in FIG. 17, since the tone value=22% yields a density=0.23, 20% is transformed into 22% by the LUT transformation. On the contrary, if the tone reproducibility is equal to the upper limit of the permissible range, 20% is transformed into 17% by the LUT transformation. Note that the LUT-transformed homogeneity in page image evaluation chart is output without any color conversion using an ICC profile or the like.

If the homogeneity in page image falls within a permissible range, the color evaluation program 22 stores information that indicates accordingly (8222), and displays an OK message (e.g., "Homogeneity in page image falls within permissible range. The control proceeds with characteristics evaluation of multinary colors") (S223). The program 22 then starts characteristics evaluation of multinary colors.

Characteristic Evaluation of Multinary Colors

The color evaluation program 22 loads an ISO12642 pattern as the color matching chart used in the color matching evaluation of the first embodiment (S231). The program instructs the printer 41 to be evaluated to print the color matching chart (S232), and outputs the color matching chart to the printer 41 (S233). In this case, the program 22 does not apply any color conversion using an ICC profile or the like.

When the user sets the color matching chart (output sample 42) output from the printer 41 on the spectrometer 43, the color evaluation program 22 controls the spectrometer 43 to measure the spectral reflectance of the color matching chart (S234). The program 22 receives the measured data (S235), and calculates multinary color characteristics (S236).

Next, the color evaluation program 22 makes a decision as to whether the multinary color characteristics pass or fail (S237). The program 22 makes this decision by calculating the difference between the multinary color characteristics at the time of preparation of the latest ICC profile of the printer 41 to be evaluated and the currently measured multinary color characteristics and checks if the difference falls within a permissible range. In order to calculate the difference, the calorimetric data of the color matching chart at the time of preparation of the latest ICC profile is required. However, it is difficult to store the colorimetric data in association with the ICC profile. Hence, the program 22 calculates the difference between the multinary color characteristics obtained by analyzing the latest ICC profile to calculate colorimetric data of the color matching chart, and the currently measured multinary color characteristics.

The ICC profile of the printer 41 to be evaluated normally includes an L*a*b* to CMYK B2A1 tag. On the other hand, since the ICC profile also includes a CMYK to L*a*b* tag, the program 22 can detect L*a*b* values of CMYK patches of the color matching chart. In this way, the program 33 calculates the difference by comparing the chromaticity of each patch analyzed from the ICC profile, and that of each actually measured patch.

The criterion of pass/failure is set to include a maximum color difference=5 and an average color difference=2 as in the evaluation of the homogeneity in page image. If the maximum color difference>5 or the average color difference>2, it is determined that the multinary color characteristics fail.

If the multinary color characteristics fail, the color evaluation program 22 checks if the evaluation of the multinary color characteristics has failed twice (S238). In the case of a second failure, since the program 22 determines that the characteristics of the printer 41 have varied due to some factors, and colors change every output, it displays an end message (e.g., "Adjust printer") (S239), thus prompting the user to adjust the printer. In the case of the first failure, the program 22 re-prepares an ICC profile based on the measured data of the color matching chart (S240), and the process returns to step S231 to evaluate the multinary color characteristics again.

If the multinary color characteristics has passed, the color evaluation program 22 stores information indicating that the multinary color characteristics fall within the permissible range (S241), and displays an OK message (e.g., "Multinary color characteristics fall within permissible range. The control proceeds with color matching evaluation") on the monitor 44 (S242).

Color Matching Evaluation

The color matching evaluation is substantially the same as the processing in steps S113 to S121 shown in FIG. 9B. Therefore, steps different from the processing in steps S113 to S121 shown in FIG. 9B will be explained. The same step numbers in FIG. 15D denote the same steps, and a detailed description thereof will be omitted.

Upon completion of the calculation of the color matching precision (S121), the color evaluation program 22 displays the evaluation results of the color matching precision, and stores the evaluation results of the maximum density and tone reproducibility, the homogeneity in page image, and multinary color characteristics and color matching precision as measurement data 35 in the HDD 27 (S251). That is, the program 22 adds the following items to the evaluation result information shown in FIG. 11. Of course, there are no items to be added if the normal state checking processing is skipped.

Determination result of maximum density and tone reproducibility

Change amounts Max_ΔD, Min_ΔD, and Ave_ΔD of maximum density

Determination result of multinary color characteristics

Color differences Max_ΔE, Min_ΔE, and Ave_ΔE of multinary color characteristics

In the above example, the maximum density and tone reproducibility are evaluated using the density value. The normal state checking processing can be executed based on a color difference if the chromaticity characteristics of a plain color solid part and those of a tone part are input in advance or are obtained by analyzing the ICC profile.

According to the fourth embodiment, the factors of the color matching precision drop can be easily recognized. FIG. 18 shows adjustment and correction corresponding to the factors. If the maximum density and tone reproducibility are factors, automatic tone correction is to be executed again using the printer 41. If the homogeneity in page image is a factor, it is effective to perform adjustment by a service person or shading correction. Note that all the users who use the printer 41 can be notified of the state of the printer 41 via a network to which the evaluation apparatus 21 is connected in addition to a display. In the case of an apparatus which has a contract for a maintenance service like a multi-functional peripheral equipment (MFP), the program 11 may send information indicating the status of that apparatus to a service spot via the Internet. In this way, the evaluation result can be used significantly.

If the multinary color characteristics fall outside the permissible range, even though the maximum density and tone reproducibility, and the homogeneity in page image fall within the permissible ranges, an ICC profile should be re-prepared. However, if the color reproducibility of multinary colors does not fall within the permissible range after re-preparation of the ICC profile, it is estimated that color variations have occurred accordingly. Most color variations are caused by deterioration of various parts of the printer 41, i.e., that of a developer, transfer roller, fixing roller, and the like. In this case, it is desirable to adjust the main body.

Even when the multinary color characteristics fall within the permissible range, if the color matching precision is poor, the color gamut may be narrow in the first place. In such case, it is desirable to re-prepare an ICC profile by changing parameters that broaden the gamut (e.g., using coat paper with a broad gamut, increasing the maximum density, and so forth).

As described above, the user can recognize the degree of deterioration of the homogeneity in page image upon evaluation of the color matching precision. Furthermore, as has been described in the second embodiment, the user can also recognize the influence of the homogeneity in page image on the important colors (interest colors). As a result, the user can correctly determine whether an ICC profile is to be re-prepared or the homogeneity in page image is to be adjusted.

Furthermore, since the image evaluation items other than the homogeneity in page image are evaluated before evaluation of the color matching precision, the user can recognize further segmented factors of the drop in color matching precision. The evaluation apparatus can notify a service person or the user of such information to execute maintenance of an image forming apparatus, homogeneity in page image correction control, automatic tone correction, and the like, thus accurately and efficiently improving the color matching precision.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments-are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-380167, filed Dec. 28, 2005, which is hereby incorporated by reference herein in its entirety.

What is claimed is:

1. A method of evaluating an image forming apparatus, the method comprising the steps of:

inputting data associated with spectral reflectances of a plurality of points on a first evaluation chart output from the image forming apparatus by supplying first image data that represents an image having a uniform density in a region to be evaluated in one page to the image forming apparatus to form the first evaluation chart;

calculating color differences between a color at a predetermined point and colors at other points on the first evaluation chart based on the data associated with the spectral reflectances on the first evaluation chart;

inputting data associated with spectral reflectances of a plurality of points on a second evaluation chart output from the image forming apparatus by supplying second image data that corresponds to a color target for color matching to the image forming apparatus to form the second evaluation chart;

calculating color differences between data associated with the spectral reflectances of the plurality of points on the second evaluation chart and data associated with spectral reflectances of the color target, which correspond to the plurality of points on the second evaluation chart; and controlling execution of the second inputting step and the second calculating step so that when the color differences calculated in the first calculating step fall within a permissible range of heterogeneity of colors in the region to be evaluated, the second inputting step and the second calculating step are executed, and when the color differences calculated in the first calculating step fall outside the permissible range, execution of the second inputting step and the second calculating step is skipped.

2. The method according to claim 1, further comprising the step of displaying, when the color differences calculated in the first calculating step fall outside the permissible range of the heterogeneity of colors in the region to be evaluated, a warning that prompts a user to adjust the image forming apparatus.

3. The method according to claim 1, wherein the first evaluation chart is a chart used to evaluate homogeneity in page image of an output of the image forming apparatus, the first image data is output to the image forming apparatus without any color conversion, and the second image data is output to the image forming apparatus after the color conversion.

4. The method according to claim 1, wherein the second evaluation chart has a plurality of color patches corresponding to the plurality of points, and colorimetry points of the first evaluation chart have one-to-one correspondence with positions of the color patches of the second evaluation chart.

5. The method according to claim 4, further comprising the step of subtracting the color difference that corresponds to a point of interest and is calculated in the first calculating step from the color difference of the point of interest calculated in the second calculating step to obtain a corrected color difference of the point of interest.

6. The method according to claim 1, further comprising the steps of:

inputting data associated with spectral reflectances of a plurality of points on a third evaluation chart output from the image forming apparatus by supplying image data for tone reproducibility evaluation of a plain color to the image forming apparatus to form the third evaluation chart; and calculating color differences between data associated with the spectral reflectances of the plurality of points on the third evaluation chart and grayscale reference data corresponding to the plurality of points on the third evaluation chart, wherein the grayscale reference data serve as references for the tone reproducibility of the plain color, and wherein the controlling step includes a step of executing, when the color differences calculated in the third calculating step fall within a permissible range of a density and tone reproducibility, the first inputting step, the first calculating step, the second inputting step, and the second calculating step, and skipping, when the color differences fall outside the permissible range of the density and tone reproducibility, execution of the first inputting step, the first calculating step, the second inputting step, and the second calculating step.

7. The method according to claim 6, further comprising the step of correcting the first image data in accordance with the color differences calculated in the third calculating step.

8. The method according to claim 1, further comprising the steps of:

inputting data associated with spectral reflectances of a plurality of points on a fourth evaluation chart output from the image forming apparatus by supplying image data for color matching evaluation to the image forming apparatus to form the fourth evaluation chart and calculating color differences between the data associated with the spectral reflectances on the fourth evaluation chart and color reference data corresponding to the plurality of points on the fourth evaluation chart, wherein the color reference data serve as references for the color matching evaluation, and wherein the controlling step includes a step of executing, when the color differences calculated in the fourth calculating step fall within a permissible range of characteristics of secondary colors or higher, executing the first inputting step, the first calculating step, the second inputting step, and the second calculating step, and re-executing, when the color differences fall outside the permissible range of the characteristics of the secondary colors or higher, preparation of a color conversion table of the image data and the processing associated with the fourth evaluation chart.

9. The method according to claim 1, further comprising the step of setting a maximum value and an average value of the color differences which represent the permissible range of the heterogeneity of colors in the region to be evaluated.

10. A color processing apparatus for evaluating an image forming apparatus, the color processing apparatus comprising:

a first input section, arranged to input data associated with spectral reflectances of a plurality of points on a first evaluation chart output from the image forming apparatus by supplying first image data that represents an image having a uniform density in a region to be evaluated in one page to the image forming apparatus to form the first evaluation chart;

a first calculator, arranged to calculate color differences between a color at a predetermined point and colors at other points on the first evaluation chart based on the data associated with the spectral reflectances on the first evaluation chart;

a second input section, arranged to input data associated with spectral reflectances of a plurality of points on a second evaluation chart output from the image forming apparatus by supplying second image data that corresponds to a color target for color matching to the image forming apparatus to form the second evaluation chart;

a second calculator, arranged to calculate color differences between data associated with the spectral reflectances of the plurality of points on the second evaluation chart and data associated with spectral reflectances of the color target, which correspond to the plurality of points on the second evaluation chart; and a controller, arranged to control operation of said second input section and said second calculator so that when the color differences calculated by said first calculator fall within a permissible range of heterogeneity of colors in the region to be evaluated, said second input section and said second calculator operate, and when the color differences calculated in by said first calculator fall outside the permissible range, operations of said second input section and said second calculator are skipped.

11. A computer readable product storing a computer readable program enabling a computer to perform a method of evaluating an image forming apparatus, the method comprising the steps of:

inputting data associated with spectral reflectances of a plurality of points on a first evaluation chart output from the image forming apparatus by supplying first image data that represents an image having a uniform density in a region to be evaluated in one page to the image forming apparatus to form the first evaluation chart;

calculating color differences between a color at a predetermined point and colors at other points on the first evaluation chart based on the data associated with the spectral reflectances on the first evaluation chart;

inputting data associated with spectral reflectances of a plurality of points on a second evaluation chart output from the image forming apparatus by supplying second image data that corresponds to a color target for color matching to the image forming apparatus to form the second evaluation chart;

calculating color differences between data associated with the spectral reflectances of the plurality of points on the second evaluation chart and data associated with spectral reflectances of the color target, which correspond to the plurality of points on the second evaluation chart; and controlling execution of the second inputting step and the second calculating step so that when the color differences calculated in the first calculating step fall within a permissible range of heterogeneity of colors in the region to be evaluated, the second inputting step and the second calculating step are executed, and when the color differences calculated in the first calculating step fall outside the permissible range, execution of the second inputting step and the second calculating step is skipped.

* * * * *